(12) United States Patent
Tang

(10) Patent No.: US 7,742,852 B1
(45) Date of Patent: *Jun. 22, 2010

(54) CONTROL SYSTEM FOR AN ALL-WHEEL DRIVE ELECTRIC VEHICLE

(75) Inventor: Yifan Tang, Los Altos, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/381,846

(22) Filed: Mar. 17, 2009

Related U.S. Application Data

(63) Continuation of application No. 12/380,427, filed on Feb. 26, 2009.

(51) Int. Cl.
*G06F 17/00* (2006.01)

(52) U.S. Cl. ....................................................... 701/22
(58) Field of Classification Search .................. 701/22, 701/82, 90, 69; 180/65.1, 65.31, 65.8
See application file for complete search history.

(56) References Cited

U.S. PATENT DOCUMENTS

| | | | | |
|---|---|---|---|---|
| 5,804,935 A | * | 9/1998 | Radev | ..................... 318/139 |
| 2004/0104699 A1 | * | 6/2004 | Nishikawa et al. | .......... 318/376 |
| 2007/0038340 A1 | * | 2/2007 | Sekiguchi et al. | ............. 701/22 |

* cited by examiner

*Primary Examiner*—Kim T Nguyen
(74) *Attorney, Agent, or Firm*—Patent Law Office of David G. Beck

(57) ABSTRACT

A method and apparatus for optimizing the torque applied to the primary and assist drive systems of an all-electric vehicle is provided, the torque adjustments taking into account wheel slip as well as other vehicular operating conditions.

30 Claims, 17 Drawing Sheets

CONTROL SYSTEM FOR AN ALL-WHEEL DRIVE ELECTRIC VEHICLE

CROSS-REFERENCES TO RELATED APPLICATIONS

This application is a continuation of U.S. patent application Ser. No. 12/380,427, filed Feb. 26, 2009, the disclosure of which is incorporated herein by reference for any and all purposes.

FIELD OF THE INVENTION

The present invention relates generally to electric vehicles and, more particularly, to a control system for an all-wheel drive electric vehicle.

BACKGROUND OF THE INVENTION

The advantages of using an all-wheel drive system in a vehicle are well known. In general, an all-wheel drive system improves traction, and thus safety, by allowing power to be sent to all four wheels, rather than just the front two or the rear two. Thus when traction is lost in one or more wheels, for example due to wet or icy road conditions, the drive system can increase the torque to the axle/wheels with traction.

A variety of control systems have been developed to detect tire slippage, i.e., wheel spin, and to redirect the available torque to the remaining wheels. These control systems range from simple hydraulic and mechanical systems to relatively sophisticated electronic control systems. For example, U.S. Pat. No. 4,589,511 describes a traction control system that uses wheel spin sensors to detect the spinning of a wheel or wheels, and an electronically controlled wheel braking system to prevent wheel spinning.

Many of the current traction control systems, while providing efficient traction control in a conventional vehicle utilizing a combustion engine drive train, are unsatisfactory for a hybrid or all-electric vehicle due to differences in vehicle weight and weight distribution, and more importantly differences in drive train torque and power capabilities. Accordingly, what is needed is a traction control system designed to meet the needs of such alternative fuel vehicles in general, and all-electric vehicles in particular. The present invention provides such a system.

SUMMARY OF THE INVENTION

The present invention provides a method and apparatus for optimizing the torque applied to the primary and assist drive systems of an all-electric vehicle, the torque adjustments taking into account wheel slip as well as other vehicular operating conditions.

In at least one embodiment of the invention, an electric vehicle drive system is disclosed that includes a primary drive system, an assist drive system, a plurality of wheel speed sensors and a torque control system. The primary drive system includes a primary electric motor coupled to at least one wheel of a first axle, and a primary power control module configured to receive primary motor torque commands and control the primary motor based on the received primary motor torque commands. The assist drive system includes a first assist electric motor coupled to a first wheel of a second axle, and a first assist power control module configured to receive first assist motor torque commands and control the first assist motor based on the received first assist motor torque commands. The assist drive system further includes a second assist electric motor coupled to a second wheel of the second axle, and a second assist power control module configured to receive second assist motor torque commands and control the second assist motor based on the received second assist motor torque commands. The torque control system outputs the primary, first assist and second assist motor torque commands. The torque control system includes (i) a traction control command generation unit for computing vehicle speed, wheel slip ratios, and slip error ratios corresponding to the first axle and the first and second wheels of the second axle; (ii) a torque split unit for computing an optimal primary motor torque request, an optimal first assist motor torque request and an optimal second assist motor torque request; and (iii) a traction and stability control unit for minimizing the slip error ratios, transforming the optimal primary motor torque request into the primary motor torque command, transforming the optimal first assist motor torque request into the first assist motor torque command, and transforming the optimal second assist motor torque request into the second assist motor torque command. The system may include motor speed sensors, motor temperature sensors, power control module temperature sensors, steering sensors, brake sensors, and accelerator sensors. The system may include one or more energy storage systems (ESS's) as well as ESS temperature sensors, ESS voltage sensors, and ESS current sensors. The traction and stability control unit may include a second stage feedback control system for minimizing motor speed fast disturbances. The traction and stability control unit may include a transient torque boost feedforward control circuit. The torque split unit preferably computes the optimal primary and assist motor torque requests by interpolating data from a look-up table. The torque split unit preferably computes an optimal primary motor flux command, an optimal first assist motor flux command, and an optimal second assist motor flux command.

In at least one embodiment of the invention, a method of enhancing electric vehicle traction is disclosed, the method comprising the steps of computing vehicle speed, computing a total torque requirement request, splitting the total torque requirement request into optimal primary and assist motor torque requests, splitting the optimal assist motor torque request into optimal first assist and optimal second assist motor torque requests, monitoring at least one wheel speed sensor coupled to the first electric vehicle axle, monitoring a second wheel speed sensor coupled to the first wheel of the second electric vehicle axle, monitoring a third wheel speed sensor coupled to the second wheel of the second electric vehicle axle, computing first, second and third wheel slip errors corresponding to the first axle and the first and second wheels of the second axle, minimizing the first, second and third wheel slip errors and transforming the optimal primary, first assist and second assist motor torque requests into primary, first assist and second assist motor torque commands, and controlling the primary, first assist and second assist electric motors of the electric vehicle based on the primary, first assist and second assist motor torque commands. The disclosed method may further comprise one or more monitoring steps, including; monitoring primary and assist motor speed sensors, monitoring a steering sensor, monitoring a brake sensor, monitoring an accelerator sensor, monitoring primary, first assist and second assist power control module temperature sensors, monitoring energy storage system (ESS) temperature sensors, monitoring ESS voltage sensors, and monitoring ESS current sensors. The disclosed method may further comprise the steps of computing primary, first assist and second assist motor maximum available torque and limiting the optimal primary, first assist and second assist motor torque requests by the primary, first assist and second assist motor maximum available torque and/or limiting the primary, first assist and second assist motor torque commands by the primary, first assist and second assist motor maximum available torque. The disclosed method may further comprise the step of computing optimal primary, first assist and second assist motor flux commands.

A further understanding of the nature and advantages of the present invention may be realized by reference to the remaining portions of the specification and the drawings.

DESCRIPTION OF THE SPECIFIC EMBODIMENTS

In the following text, the terms "electric vehicle" and "EV" may be used interchangeably and refer to an all-electric vehicle. Similarly, the terms "hybrid", "hybrid electric vehicle" and "HEV" may be used interchangeably and refer to a vehicle that uses dual propulsion systems, one of which is an electric motor and the other of which is a combustion engine. Similarly, the terms "all-wheel-drive" and "AWD" may be used interchangeably and refer to a vehicle drive system in which every wheel, or every set of wheels sharing the same axle or axis, is provided with a separate motor. Similarly, the terms "battery", "cell", and "battery cell" may be used interchangeably and refer to any of a variety of different rechargeable cell chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and current capacity for a particular application. The terms "energy storage system" and "ESS" may be used interchangeably and refer to an electrical energy storage system that has the capability to be charged and discharged such as a battery, battery pack, capacitor or supercapacitor. Lastly, identical element symbols used on multiple figures refer to the same component, or components of equal functionality.

Figure 1:
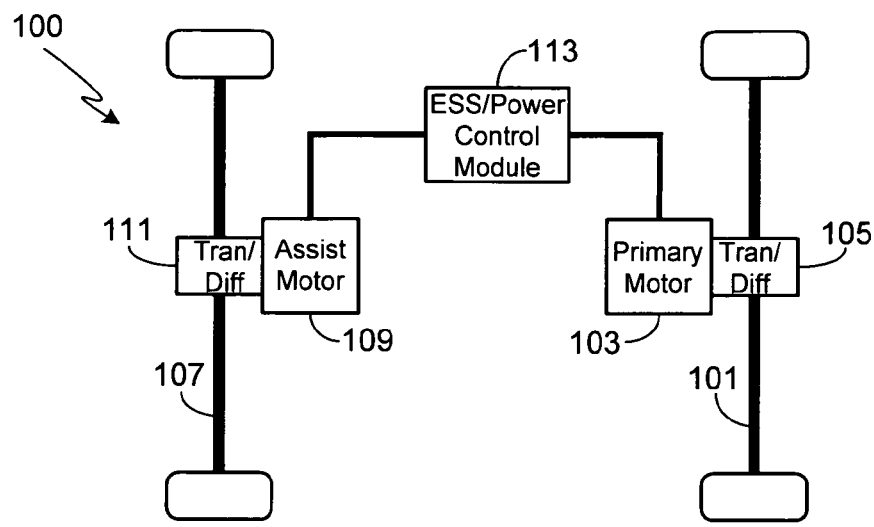
FIG. 1 illustrates the basic elements of a dual electric motor drive system for use with the present invention.

FIG. 1 illustrates the basic elements of a dual electric motor drive system 100 for use with the control system of the invention. As shown, each axle is coupled to an independent power source, specifically rear axle 101 is coupled to an electric motor 103 via a transmission/differential assembly 105, and front axle 107 is coupled to an electric motor 109 via a transmission/differential assembly 111. It should be understood that the present invention is not limited to a specific type/configuration of transmission or a specific type/configuration of differential. For example, although a single speed transmission is preferred, either or both transmissions can use a multi-speed transmission. Similarly, the differentials used with the present invention can be configured as open, locked or limited slip, although preferably an open or limited slip differential is used.

In the simplified illustration of FIG. 1, a single ESS/power control module 113 is shown coupled to both motors 103/109. It should be understood, however, that the present invention is not limited to a specific ESS/power control module configuration. Exemplary configurations that are applicable to the present invention are described in detail in co-pending U.S. patent application Ser. No. 12/322,218, filed Jan. 29, 2009, the disclosure of which is incorporated herein for any and all purposes.

Figure 2:
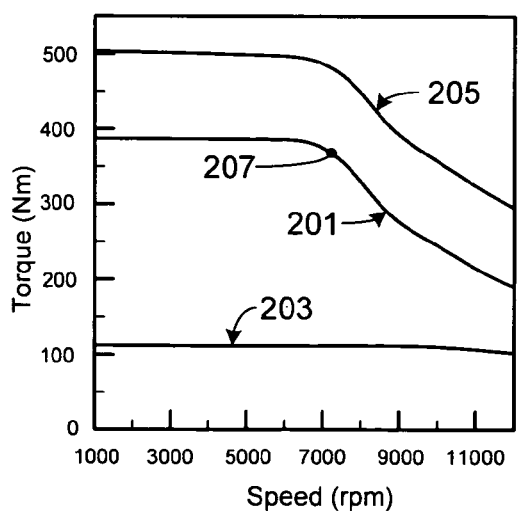
FIG. 2 graphically illustrates the torque curves for exemplary primary and assist motors.
Figure 3:
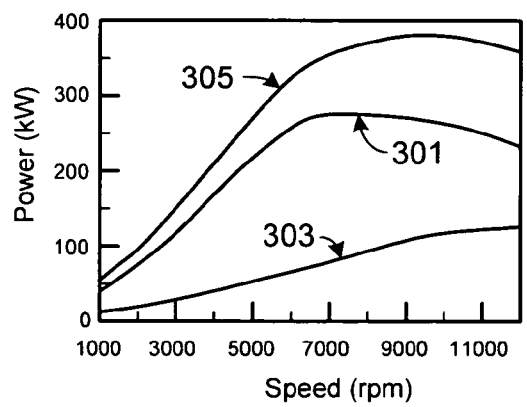
FIG. 3 graphically illustrates the power curves for exemplary primary and assist motors.

In a preferred embodiment of the invention, one of the two motors is the primary drive motor, e.g., motor 103, while the second motor, e.g., motor 109, is relegated to the role of an assisting motor. Preferably both motors 103 and 109 are AC induction motors. Additionally, in a preferred embodiment assist motor 109 is designed to have a relatively flat torque curve over a wide range of speeds, and therefore is capable of augmenting the output of primary motor 103 at high speeds, specifically in the range in which the torque of primary motor 103 is dropping off. FIGS. 2 and 3 illustrate torque and power curves, respectively, of exemplary motors. In particular, curves 201 and 301 represent the torque and power curves, respectively, of an exemplary primary motor; curves 203 and 303 represent the torque and power curves, respectively, of an exemplary assist motor; and curves 205 and 305 represent the torque and power curves, respectively, of the combination of the exemplary primary and assist motors.

It will be understood that the gear ratios of transmission/differential elements 105 and 111 may be the same, or different, from one another. If they are the same, FIGS. 2 and 3 show the motor speeds of both motors. If they are different, FIGS. 2 and 3 show the motor speed of the primary motor, with the motor speed of the secondary motor converted based on a gear ratio conversion factor. FIGS. 2 and 3 illustrate that in at least one configuration, the maximum amount of assist torque can be substantially constant throughout the motor speed, and hence vehicle speed, range of operation (FIG. 2), and as a result the maximum amount of assist power increases as a function of motor speed (FIG. 3). This preferred configuration applies to both the motoring and regenerating modes of operation. One benefit of this approach is that it can be used to compensate for torque fall-off at higher speeds, a characteristic typical of electric motors with limited operating voltage. Another benefit of significantly increasing the high speed capabilities of a vehicle in accordance with the preferred embodiment of the invention is improved vehicle performance, specifically in the areas of top speed, high speed acceleration, and hill climbing abilities. Lastly, by utilizing a dual drive approach, in some configurations a lower total motor weight can be achieved than is possible with a single motor sized to provide similar peak power capabilities.

As previously noted, the curves shown in FIGS. 2 and 3 assume the use of AC inductions motors even though the use of a specific motor or motor configuration is not a requirement of the invention. Curve 201 illustrates a characteristic common of many such electric motors, i.e., exhibiting a relatively flat peak torque at low speeds that then drops off at higher speeds. As used herein, a motor's "base speed" is defined as the speed at which the torque drops to 95% of the flat peak torque and will continue to drop after the base speed up to the top speed under constant power source limits. Therefore, for curve 201, this knee point occurs at a point 207 on the curve, leading to a base speed of approximately 7200 rpm. As used herein, a motor's "drive system base speed" is equivalent to the motor's base speed after gearing, i.e., the motor base speed divided by the transmission gear ratio. As described above and illustrated in FIGS. 2 and 3, preferably assist motor 109 is designed to provide a much higher drive system base speed than the drive system base speed of primary motor 103; more preferably assist motor 109 is designed to provide at least a 50% higher drive system base speed than the drive system base speed of primary motor 103.

The basic configuration illustrated in FIG. 1 provides a number of advantages over a single drive EV. First, the dual motor configuration provides superior traction control as power is coupled to both axles, therefore providing power to at least one wheel per axle. It will be appreciated that additional traction control can be achieved if one or both differentials utilize a limited slip or locking configuration, thereby coupling power to the remaining wheel or wheels. Second, by coupling each axle to an independent power source, vehicle traction, and therefore stability, can be dramatically improved since the torque supplied to the front wheel(s) versus the rear wheel(s) can be varied depending upon the specific situation. For example, while making a turn it may be advantageous to gradually increase the torque supplied to the front wheel(s) versus the rear wheel(s). Similarly, in icy road conditions, it may be desirable to increase the torque supplied to the front wheel(s). Third, by utilizing a dual motor configuration, regenerative braking can be used with respect to both sets of wheels, thus providing enhanced braking as well as improved battery charging capabilities. Fourth, assuming an assist motor with a relatively flat torque curve, in addition to providing additional power at all speeds, the assist motor provides greatly enhanced performance at high speeds when the primary motor starts losing torque.

As previously noted, the use of a dual drive configuration offers a number of advantages over a single drive configuration. The present invention expands upon these advantages by providing a torque and traction control system that is capable of rapidly and efficiently splitting the torque between the two drive systems. As a consequence, wheel slippage is minimized and vehicle traction and stability is greatly improved in a variety of operating conditions. These improvements are evident in both cornering and straight-line traction, and in wheel slip control.

Figure 4:
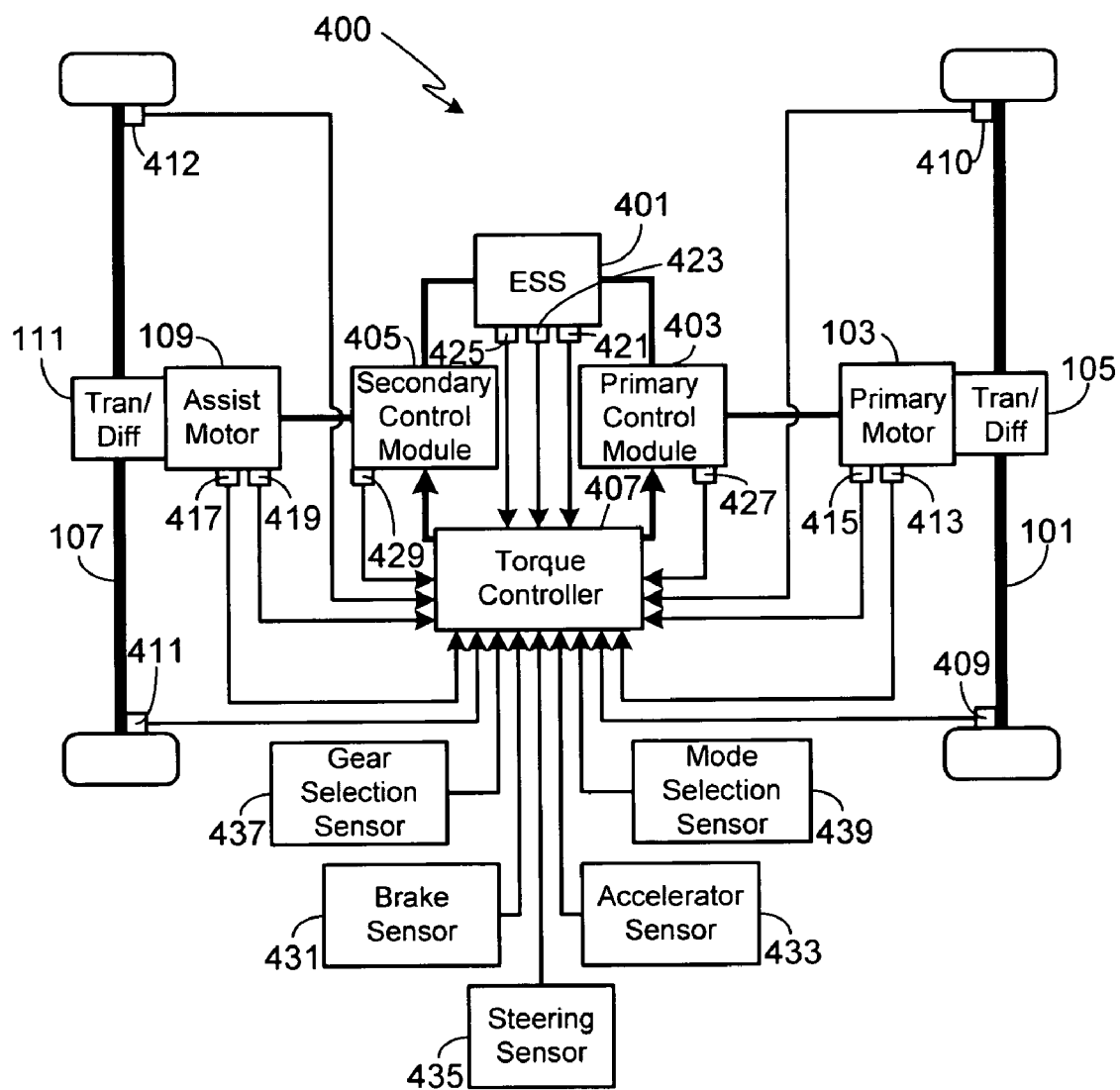
FIG. 4 illustrates the basic elements of a control system for a dual electric motor drive system in accordance with the invention.

FIG. 4 illustrates the basic configuration of a preferred embodiment of the invention. As shown, primary motor 103 is connected to the ESS 401 via the primary power control module 403. Similarly, assist motor 109 is connected to ESS 401 via a secondary power control module 405. Primary and secondary power control modules 403 and 405 each include a DC to AC inverter. The power control modules 403/405 are used to insure that the power delivered to motors 103/109 or the regenerated power recovered from motors 103/109 have the desired voltage, current, waveform, etc. As such, power control modules 403/405 may be comprised of passive power devices (e.g., transient filtering capacitors and/or inductors), active power devices (e.g., semiconductor and/or electromechanical switching devices, circuit protection devices, etc.), sensing devices (e.g., voltage, current, and/or power flow sensors, etc.), logic control devices, communication devices, etc.

Although FIG. 4 shows a single ESS, as previously noted other configurations can be used with the invention, for example ones in which each motor is connected to a separate ESS. Alternate ESS and power control configurations are described in detail in co-pending U.S. patent application Ser. No. 12/322,218, filed Jan. 29, 2009, the disclosure of which is incorporated herein for any and all purposes.

In accordance with the invention, system 400 includes a torque and traction controller 407 that determines the power, i.e., voltage, current, and waveform, that each of the power control modules supplies to their respective motors, and thus the torque and power that each motor applies to the wheel or wheels to which it is coupled. In order to calculate the appropriate power to be supplied to each motor, and thus the torque/power to be supplied to the individual wheels, torque and traction controller 407 is coupled to, and receives data from, a variety of sensors throughout the vehicle. In general, these sensors can be divided into four groups; those used to monitor vehicle performance, those used to monitor the drive system, those used to monitor the condition and performance of the ESS and the power control electronics, and those used to monitor user input. A description of exemplary sensors for each group of sensors follows.

Vehicle Performance Sensors—The sensors within this group monitor the on-going performance of the vehicle by monitoring wheel spin, and thus tire slippage. Preferably a wheel spin sensor is coupled to each wheel, i.e., sensors 409-412.

Drive System Sensors—The sensors within this group monitor the performance of the primary and assist motors. Preferably coupled to the primary motor is a temperature sensor 413 and a motor speed sensor 415, and coupled to the assist motor is a temperature sensor 417 and a motor speed sensor 419.

ESS and Power Control Electronics Sensors—The sensors within this group monitor the condition of the ESS and power control modules. Preferably coupled to ESS 401 is a temperature sensor 421, a voltage sensor 423 and a current sensor 425. Preferably coupled to primary power control module 403 is a temperature sensor 427. Preferably coupled to secondary power control module 405 is a temperature sensor 429.

User Input Sensors—The sensors within this group monitor user input. Exemplary sensors in this group include a brake sensor 431, an accelerator sensor 433, and a steering sensor 435. These sensors can be coupled to the corresponding pedals and/or steering wheel, coupled to the corresponding linkage, or otherwise coupled to the vehicle drive systems such that braking, accelerator and steering data is obtained. The system may also include a gear selection sensor 437 if the vehicle includes a multi-gear transmission, as opposed to a single speed transmission. The system may also include a mode selection sensor 439 if the vehicle allows the user to select from multiple operating modes, e.g., high efficiency mode, high performance mode, etc.

Although the primary sensors used by torque and traction controller 407 are shown in FIG. 4 and described above, it will be appreciated that the invention can use other sensors to provide additional information that can be used to determine the optimal torque split between the primary and assist drive system. For example, by monitoring the ambient temperature and/or monitoring humidity/rainfall, the system can adapt for inclement weather, i.e., wet and slippery conditions or potential icy conditions. Similarly, by monitoring vehicle incline, the system can adapt for steep hill climbing or descending conditions.

Figure 5:
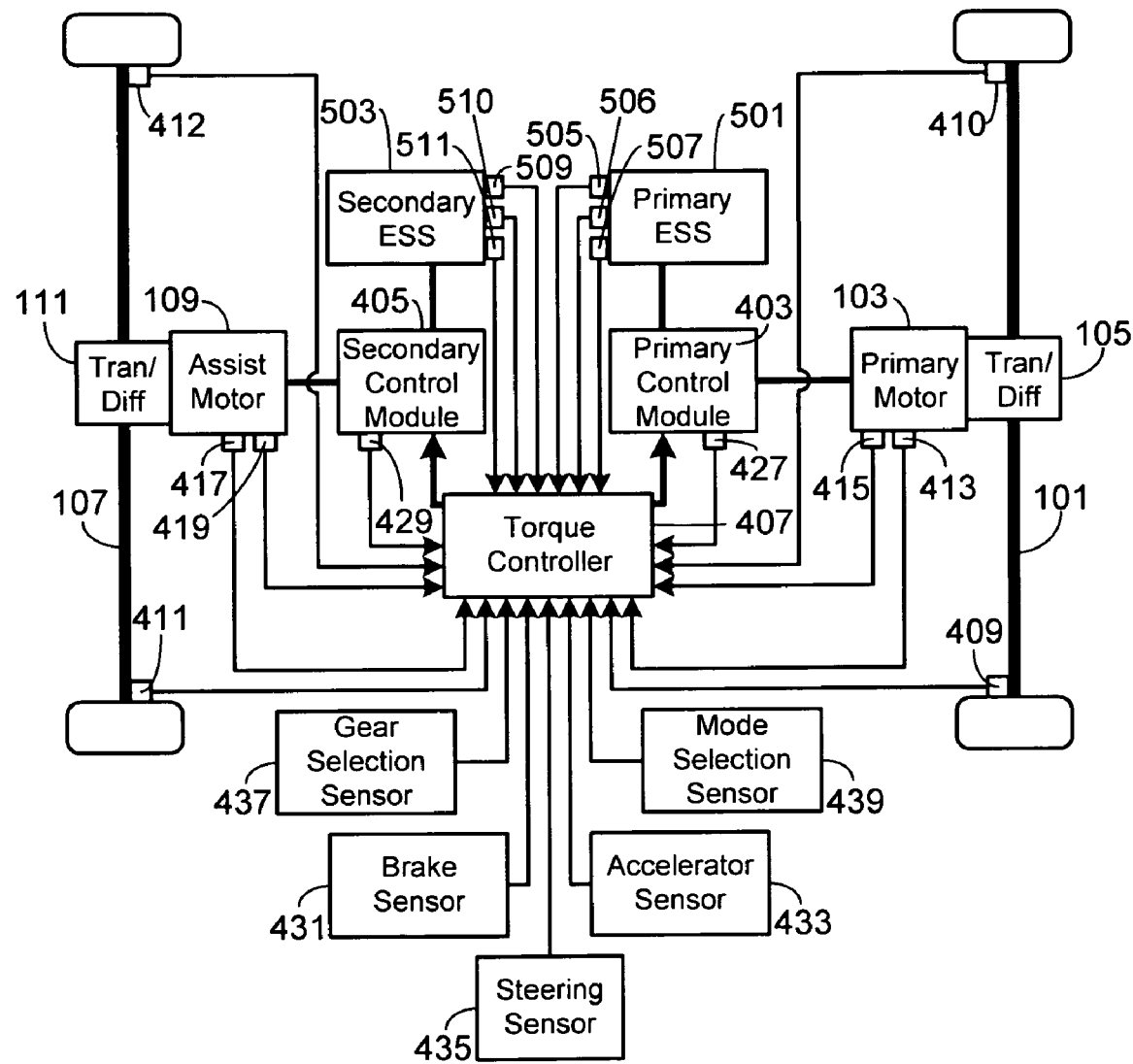
FIG. 5 illustrates the basic elements of a control system for a dual electric motor drive system similar to that shown in FIG. 4, with the exception that each motor/power control module is coupled to a separate ESS.

As previously noted, the present invention is not limited to vehicle systems in which both drive trains are coupled to a single ESS. For example, FIG. 5 illustrates a torque and traction control system similar to that shown in FIG. 4, with the exception that each motor/power control module is coupled to a separate ESS. Specifically, primary motor 103 and primary power control module 403 are coupled to ESS 501 while assist motor 109 and secondary power control module 405 are coupled to ESS 503. In this embodiment primary motor ESS 501 includes temperature, voltage and current sensors 505-507, respectively, and assist motor ESS 503 includes temperature, voltage and current sensors 509-511, respectively. If desired, the ESS 501 can be coupled to ESS 503, for example using a bi-directional DC/DC converter (not shown) as described in detail in co-pending U.S. patent application Ser. No. 12/322,218, filed Jan. 29, 2009, the disclosure of which is incorporated herein for any and all purposes.

Figure 6:
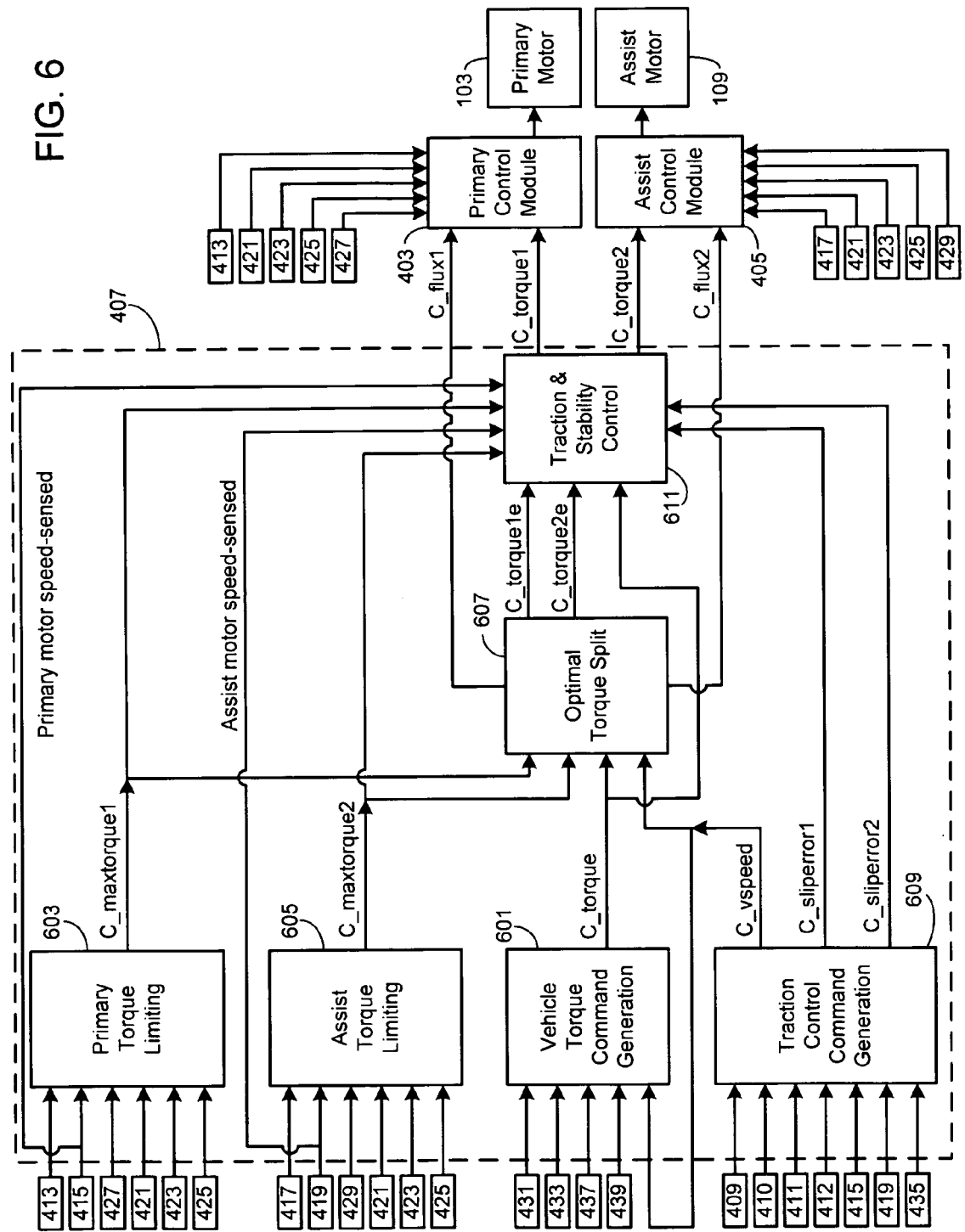
FIG. 6 illustrates the basic elements of the system controller shown in FIG. 4.

FIG. 6 provides a more detailed schematic of torque and traction controller 407. As shown, data from the brake sensor 431, accelerator sensor 433, gear selection sensor 437 (if the vehicle has multiple gears) and mode selection sensor 439 (if the vehicle includes multiple modes) are input into the vehicle torque command generation unit 601. The computed vehicle speed, referred to herein as "C_vspeed", is also input into the vehicle torque command generation unit 601. C_vspeed is computed by the traction command generation unit 609. The output of unit 601 is a total torque requirement request, referred to herein as "C_torque". C_torque is the torque required from the combined drive trains.

The maximum torque available from the primary and assist motors, referred to herein as "C_maxtorque1" and "C_maxtorque2", are calculated by the primary torque limiting unit 603 and the assist torque limiting unit 605, respectively. The inputs to the primary torque limiting unit 603 are the data from primary motor temperature sensor 413, primary motor speed sensor 415, and primary power control module temperature sensor 427. The inputs to the assist torque limiting unit 605 are the data from assist motor temperature sensor 417, assist motor speed sensor 419, and secondary power control module temperature sensor 429. Assuming a single ESS configuration, for example as shown in FIG. 4, ESS data input to both units 603 and 605 are the ESS temperature data from sensor 421 as well as the ESS voltage and current data from sensors 423 and 425, respectively. If the drive trains use separate ESS systems as illustrated in FIG. 5, then the ESS data input into unit 603 is from sensors 505-507 and the data input into unit 605 is from sensors 509-511.

The torque required from the combined drive trains calculated by unit 601, and the maximum available torque for the primary and assist motors, calculated by units 603 and 605 respectively, are input into the optimal torque split unit 607 as is the computed vehicle speed. Unit 607 optimizes the torque split between the two drive trains without taking into account wheel slip, thus splitting the desired combined torque, i.e., C_torque, into an optimal primary motor torque request and an optimal assist motor torque request, the split based solely on achieving maximum operating efficiency within the limits of the available torque for each motor.

Figure 7:
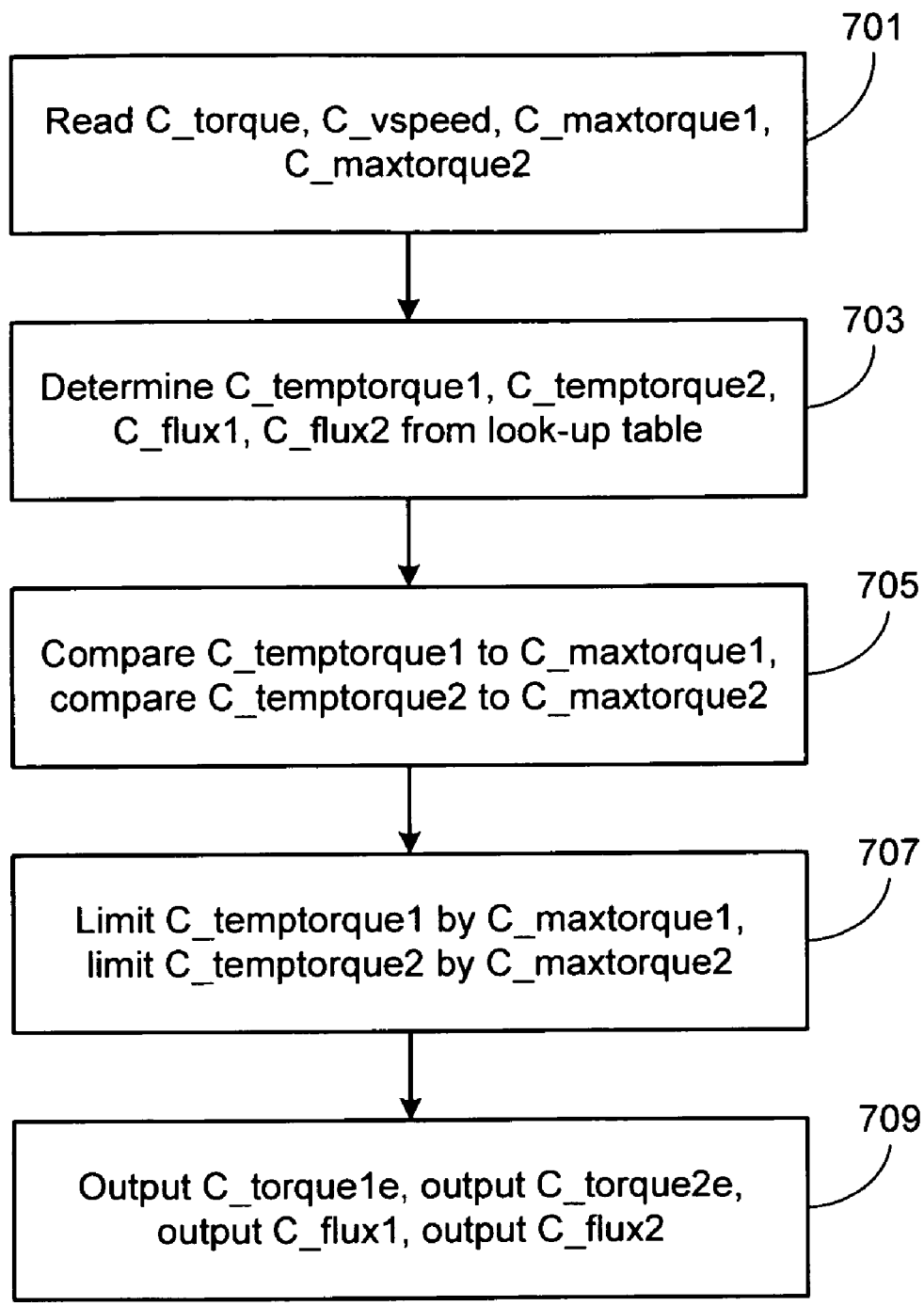
FIG. 7 illustrates the algorithm used to calculate the optimal torque split between the two drive trains, without taking into account wheel slip errors.

The system of the invention uses a simple continuously running algorithm to determine the optimal torque split, as illustrated in FIG. 7. As shown, initially C_torque, C_vspeed, C_maxtorque1 and C_maxtorque2 are read (step 701). Next, temporary values for the torque for primary motor 103 (C_temptorque1) and for assist motor 109 (C_temptorque2) are determined, as well as values for the motor flux for primary motor 103 (C_flux1) and for assist motor 109 (C_flux2). (Step 703). This step is performed by interpolating data from a look-up table, described in further detail below, that contains optimal torque (i.e., T1 and T2) and optimal flux values (i.e., F1opt and F2opt) based on vehicle speed and total requested torque. The temporary torque values set in step 703, based on the look-up table, are then compared to the maximum available torque values (step 705) calculated by the primary torque limiting unit and the assist torque limiting unit. If the temporary torque values are less than the maximum available torque values, then the temporary torque values are output as C_torque1$e$ (primary motor) and C_torque2$e$ (assist motor); if the temporary torque values are greater than the maximum available torque values, then the maximum available torque values are output as C_torque1$e$ and C_torque2$e$. (Steps 707 and 709). The flux command values for the primary motor, i.e., C_flux1, and the assist motor, i.e., C_flux2, are also output in step 709.

Figure 8:
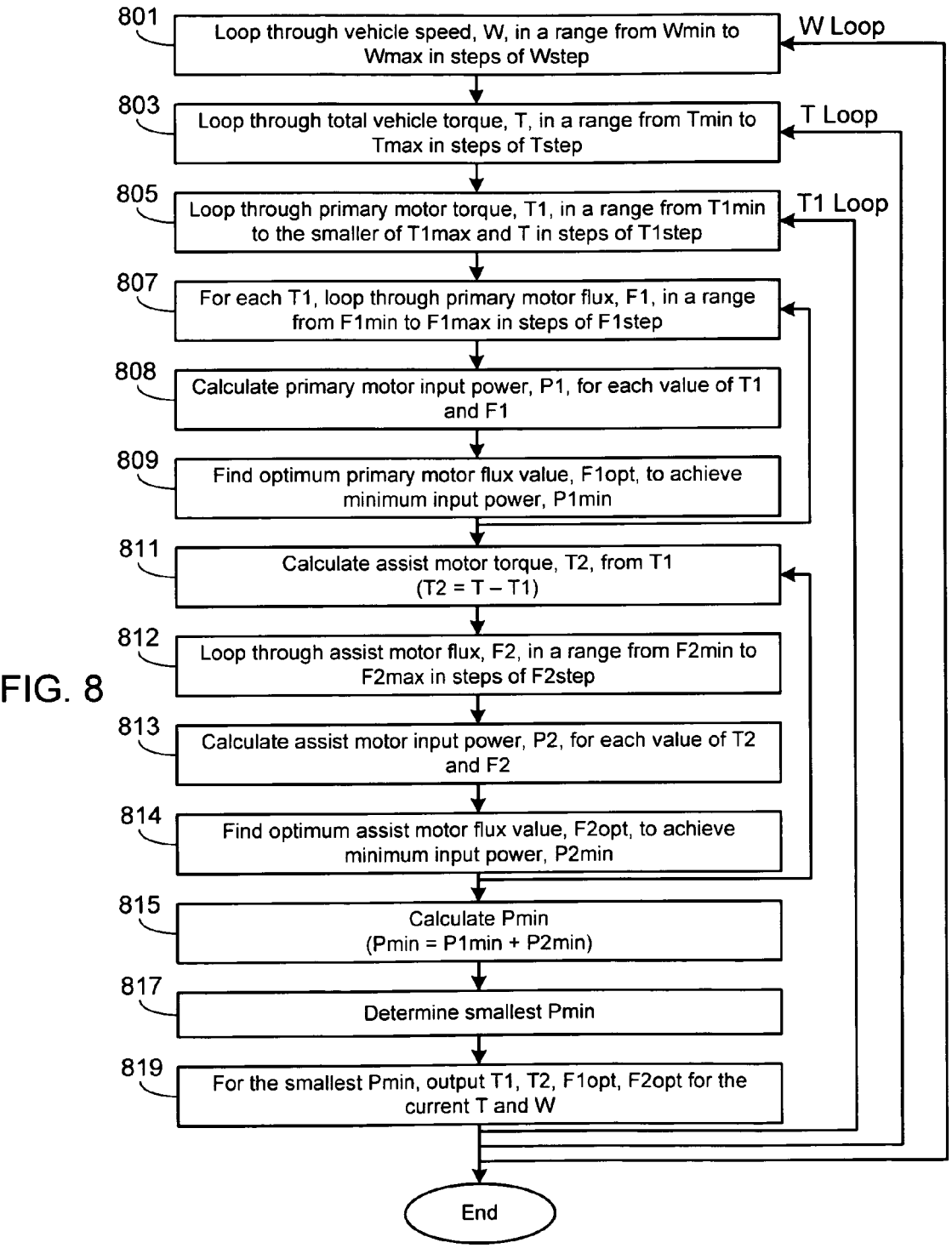
FIG. 8 illustrates the algorithm used to generate the look-up table utilized by the optimal torque split unit.

FIG. 8 illustrates the preferred algorithm used to generate the three-dimensional look-up table utilized by the optimal torque split unit 607. In step 801, a first loop is initiated in which vehicle speed, W, is stepped through from a minimum value, Wmin, to a maximum value, Wmax, in steps of Wstep. In step 803, a second loop is initiated in which total vehicle torque, T, is stepped through from a minimum value, Tmin, to a maximum value, Tmax, in steps of Tstep. In step 805, a third loop is initiated in which the torque of the primary motor, T1, is stepped through from a minimum value, T1min, to a maximum value in steps of T1step. The maximum value in step 805 is the smaller of T1max and T.

In the next series of steps, steps 807-809, the optimum flux value, F1opt, for the primary motor is determined for each value of T1. Initially, for a given value of T1 the primary motor flux F1 is stepped through from a minimum value, F1min, to a maximum value, F1max, in steps of F1step. Then for each value of T1 and F1, a value for primary motor input power, P1, is calculated. Next, F1 opt is determined, based on achieving the minimum input power, P1min.

In the next series of steps, steps 811-814, the optimum flux value, F2opt, for the assist motor is determined for each value of T1. Initially for a given value of T1, the corresponding value for the torque of the assist motor, T2, is determined, where T2 is equal to T minus T1. Then the assist motor flux F2 is stepped through from a minimum value, F2min, to a maximum value, F2max, in steps of F2step. Next, the value for the assist motor input power, P2, is calculated for each value of T2 and F2. Lastly, F2opt is determined, based on achieving the minimum input power, P2 min.

In step 815 a minimum total motor input power, Pmin, is calculated, where Pmin is equal to P1min plus P2min. Next, the smallest Pmin is found for the value of T1 for this particular iteration of the T1 loop. (Step 817) Lastly, for the smallest Pmin and the current T and W, values for T1, T2, F1opt and F2opt are output. (Step 819)

The traction control command generation unit 609 provides several functions. As input, data from each wheel spin sensor, i.e., sensors 409-412, is feed into unit 609. Additionally, data from primary motor speed sensor 415, assist motor speed sensor 419, and steering sensor 435 are input into the traction control command generation unit. Using this data, unit 609 calculates vehicle speed, C_vspeed, which is input into the vehicle torque command generation unit 601 as previously noted. Unit 609 also uses the motor speed data to provide error checking.

A primary function of unit 609 is to calculate wheel slip ratios for each wheel, the wheel slip ratio being the difference between the wheel speed and the vehicle speed, divided by the greater of the wheel speed and the vehicle speed. After calculating the wheel slip ratio for each wheel as a function of vehicle speed, a wheel slip ratio for each axle is calculated. The wheel slip ratio for an axle must take into account that different wheels on the same axle may experience different degrees of slip, and thus exhibit different slip ratios. For a limited slip differential, and in most other cases as well, preferably the higher of the two wheel slip ratios for a given axle is taken as the wheel slip ratio for that particular axle.

In order to determine if the wheel slip ratio for a given axle is greater than desired, the wheel slip ratio must be compared to a target wheel slip ratio contained within a lookup table. The lookup table provides target wheel slip ratios as a function of speed and steering angle. The lookup table can be based on well known target ratios or, as is preferred, based on test data obtained for that particular vehicle and vehicle configuration. For each axle, the difference between the computed wheel slip ratio and the target wheel slip ratio yields the computed slip error, referred to herein as "C_sliperror1" for the wheel slip ratio error of the primary-driven axle 101 and "C_sliperror2" for the wheel slip ratio error of the assist-driven axle 107. To prevent control chatter, preferably hysteresis is incorporated into the comparator used in this calculation by means of a dead band, i.e., neutral zone. In addition to controlling chatter, the hysteresis band also allows for a small amount of additional wheel slippage, which may compensate for vehicle weight dynamic distribution and improve acceleration and deceleration performance.

Figure 9:
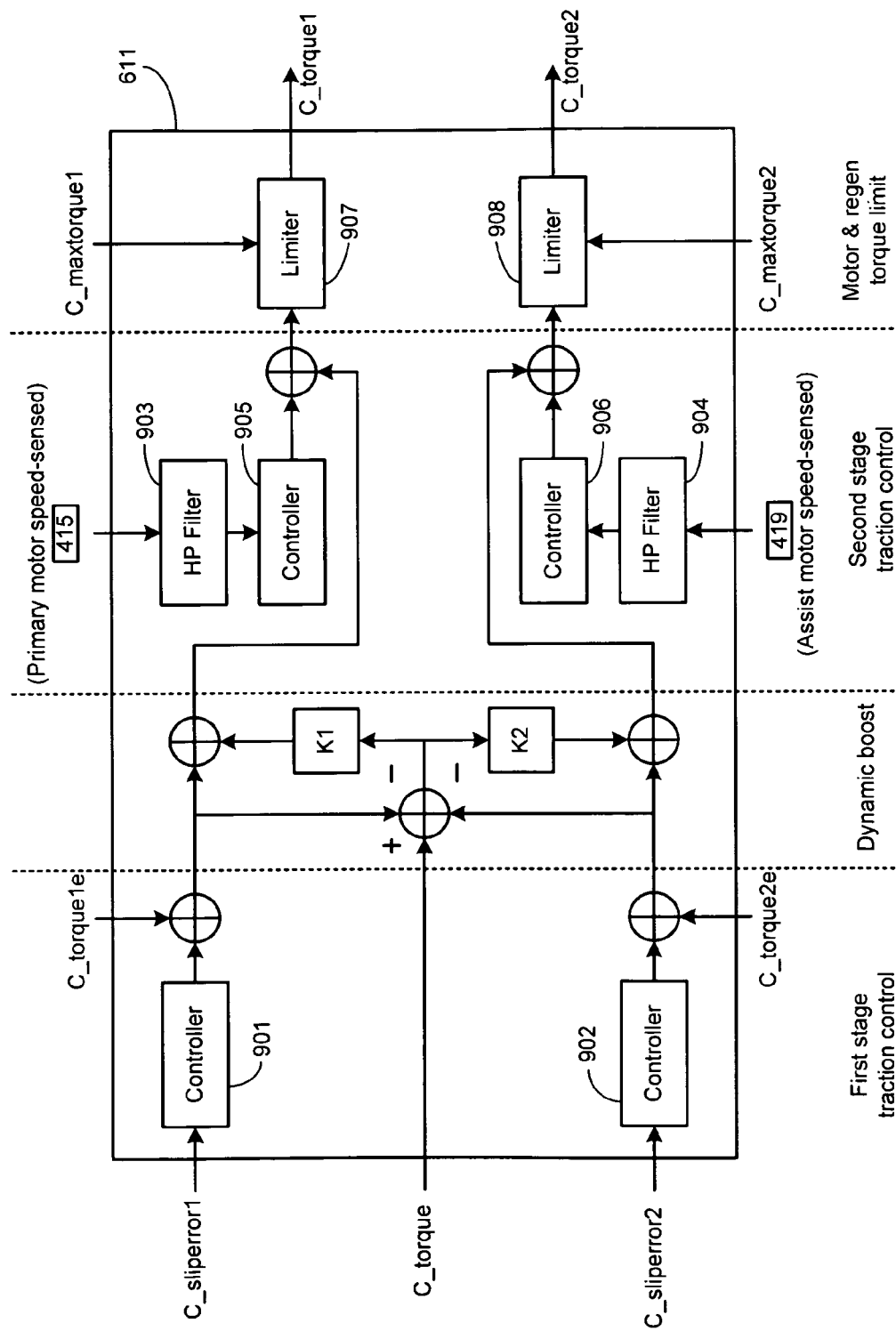
FIG. 9 illustrates a block diagram of the traction and stability control unit shown in FIG. 6.

The computed slip errors, C_sliperror1 and C_sliperror2, along with the values for the optimized torque split, C_torque1*e* and C_torque2*e*, and the total requested torque, C_torque, are input into the first stage of the traction and stability control unit 611. Details of unit 611 are shown in FIG. 9. As shown, the first stage independently minimizes the wheel slip ratio errors using a feedback control system, for example using a lead-lag controller, sliding-mode controller, PID controller or other linear or non-linear controller type. Preferably PID controllers are used for the compensators 901/902 in the first stage feedback control system. In the second stage of unit 611, motor speed fast disturbances are independently minimized using high pass filters 903/904 and compensators (preferably PID controllers) 905/906. Motor speed fast disturbances can be caused, for example, by sudden large reductions of load torque on the motor shaft during an excessive wheel slip event, or by sudden large additions of load torque on the motor shaft from one or two stuck wheels.

Between the first and second stages is a transient torque boost feedforward control circuit, referred to in the figure as dynamic boost, which adds an amount of torque to each axle. The amount of added torque is proportional to the difference between the driver torque request after the first stage of traction control and the combined torque command, C_torque. The proportional constants K1 and K2 may be tuned to be different between the two axles. The feedforward torques enhance the vehicle performance, vehicle response to driver request and drivability without compromising traction control and vehicle stability. The feedforward torques are zero when the torque request is fully met, with zero effective wheel slip ratio errors and with the maximum torque limits not in effect. During a wheel slip event that causes a torque reduction on an axle, an effect of the feedforward control is to increase the torque command to the other axle that has a better tire-to-road grip. The feedforward control also adds a torque command to the axle experiencing wheel slip, but due to the relatively smaller gain in the feedforward path, the wheel slip ratio error feedback loop still dominates and will minimize the wheel slip ratio error.

After the second stage of traction control, torque limiters 907/908 independently limit the torque commands issuing from the second stage based on C_maxtorque1 and C_maxtorque2. The output of the torque limiters 907/908 are torque commands C_torque1 and C_torque2. The torque commands from the limiters and the flux commands, C_flux1 and C_flux2, from the optimal torque split unit 607 are input into control modules 403 and 405 as shown in FIG. 6. Power control modules 403 and 405 can use any of a variety of motor control techniques, e.g., scalar control, vector control, and direct torque control. Vector control allows fast and decoupled control of torque and flux. In at least one preferred embodiment of the invention, the control modules utilize a pulse width modulator (PWM) control circuit.

In some instances the torque and flux motor control commands may be subject to further limitation, specifically due to component overheating and/or ESS power limitations. Such command limits may be applied by an additional limiter circuit within the torque and traction controller 407, or within the power control modules as illustrated in FIG. 6. In general, such limiters monitor the temperatures of the motors via sensors 413/417, the temperatures of the power electronics via sensors 427/429, and the temperature, voltage and current of ESS 401 via sensors 421/423/425. If multiple ESS systems are used, as previously described, then the temperature, voltage and current of each ESS system are taken as inputs to the limiters. In at least one embodiment using a single ESS system, if the ESS temperature is above a threshold temperature, then the commands to the motors are proportionally reduced. If the temperature of a particular power control module or a particular motor is above its preset temperature threshold, then the control commands sent to that particular motor are reduced. Preferably in such an instance the control commands sent to the non-affected motor are sufficiently increased to insure that the total requested torque, C_torque, is met. The limiters may rely on a look-up table that provides preset command reductions as a function of the amount that a monitored temperature is above its respective preset temperature threshold.

In accordance with at least one preferred embodiment, the torque and traction controller 407 uses multiple processing frequencies, the specific frequency depending upon the function of the unit in question. For example, a dual frequency approach can be used in which a relatively low frequency is applied in order to optimize the performance of the two drive systems based on general operating conditions, while a second, higher frequency is applied in order to quickly respond to rapidly developing transient conditions, e.g., wheel slippage. In this preferred approach, low frequency cycling is applied to the torque command generation unit 601, the torque limiting units 603/605, the optimal torque split unit 607 and the various temperature, voltage, current, and speed sensors. Preferably the low frequency is selected to be within the range of 100 Hz to 2 kHz, more preferably in the range of 500 Hz to 1.5 kHz, and even more preferably set at approximately 1 kHz. High frequency cycling is applied to the traction and stability control unit 611, control modules 403/405 and the wheel slip sensors, and is preferably at a frequency of about 10 to 30 times that of the low frequency, and more preferably at a frequency of approximately 20 kHz. As the traction control command generation unit 609 monitors wheel slippage and generates the slip errors for each axle, preferably it operates at the high cycle frequency although in at least one embodiment, it operates at an intermediate rate, e.g., 5-10 kHz.

Figure 10:
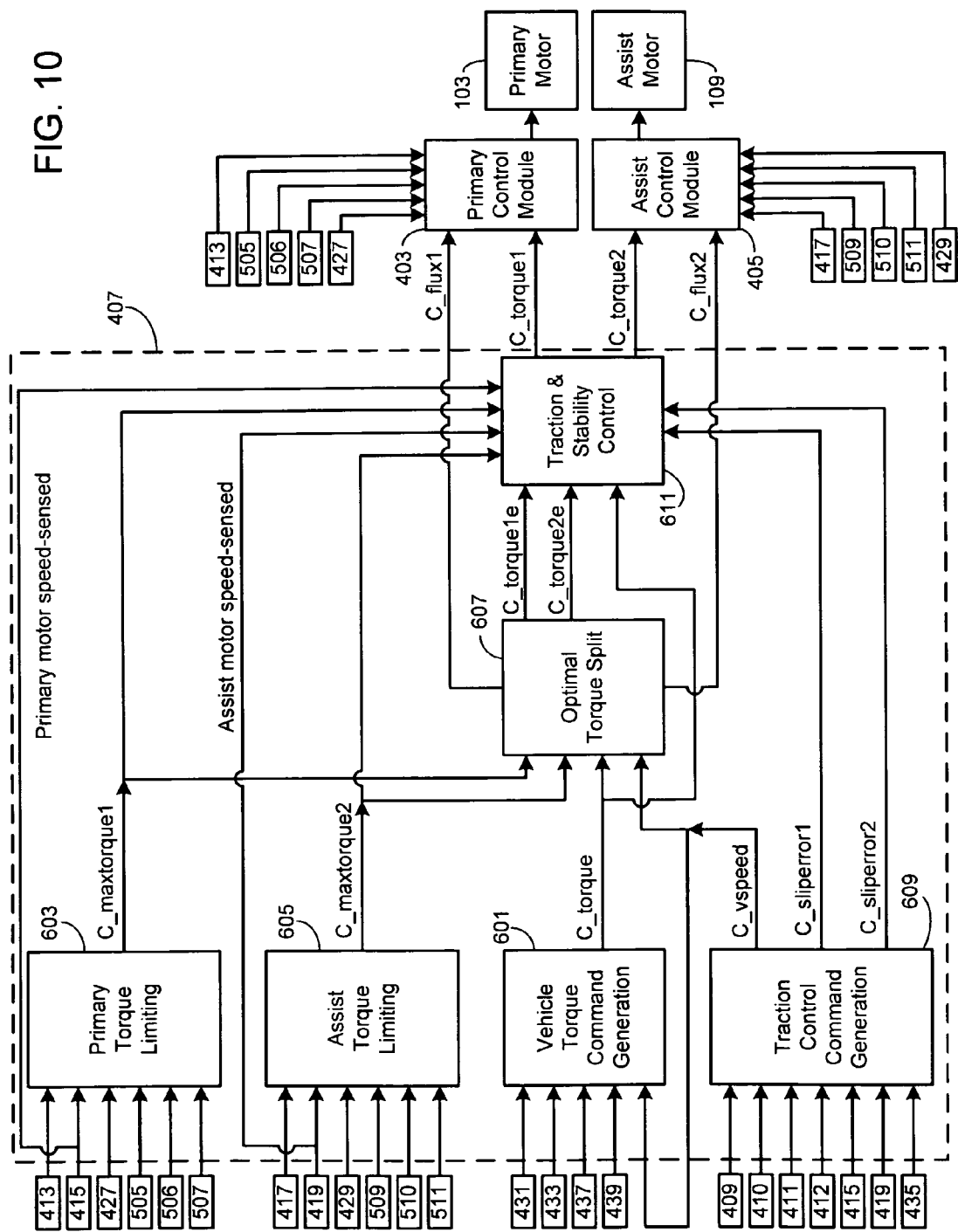
FIG. 10 illustrates the basic elements of the system controller shown in FIG. 5.

As previously noted, the present control system can be used with an EV that utilizes a single ESS for both drives, or one which utilizes an ESS per drive. The system and methodology is basically the same as previously described in detail, except that the temperature, current and voltage of each ESS must be monitored and taken into account. Thus, for example, the control system shown in FIG. 6 would be modified as shown in FIG. 10. Specifically, the temperature, current and voltage of the primary ESS 501 would be sensed with sensors 505-507 and input into the primary torque limiting unit 603 and the primary control module 403; and the temperature, current and voltage of the secondary ESS 503 would be sensed with sensors 509-511 and input into the assist torque limiting unit 605 and the assist control module 405.

Figure 11:
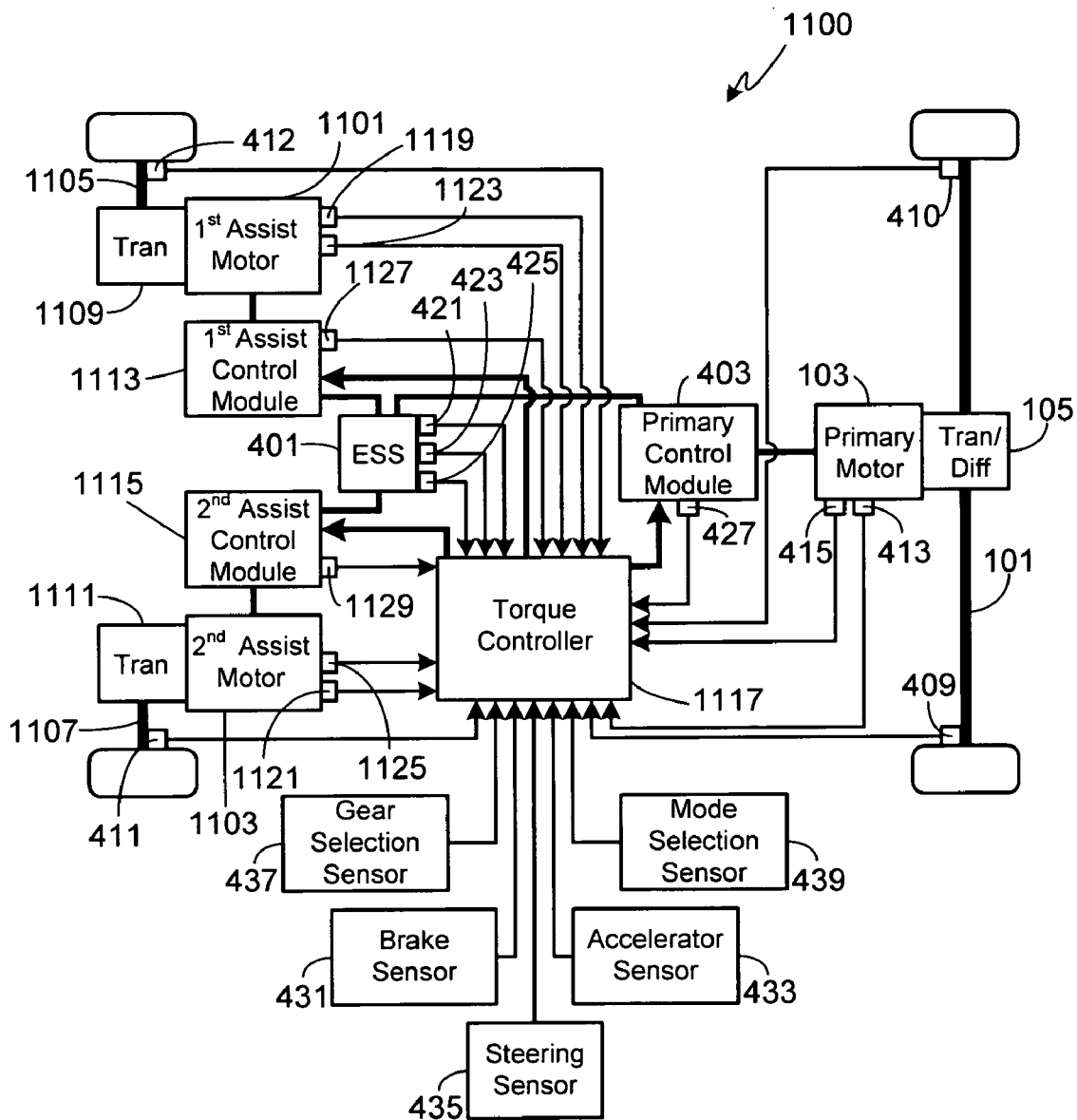
FIG. 11 illustrates the basic elements of a control system for an EV utilizing a single primary motor coupled to one axle, and dual assist motors coupled to the second axle.

The inventor also envisions using the torque and traction control system of the invention with an EV that includes a primary drive train and a secondary drive train with dual assist motors. Such a system can utilize either a single ESS system similar to that of FIG. 4, or dual ESS systems similar to that of FIG. 5. Suitable alternate ESS and power control configurations are described in detail in co-pending U.S. patent application Serial No. 12/322,218, filed Jan. 29, 2009, the disclosure of which is incorporated herein for any and all purposes. System 1100 shown in FIG. 11 is intended to illustrate one such configuration.

System 1100 is based on the configuration shown in FIG. 4, with single assist motor 109 being replaced with dual assist motors 1101 and 1103. Preferably assist motors 1101 and 1103 are coupled to split axles 1105 and 1107 via gear assemblies 1109 and 1111. In these embodiments, motors 1101 and 1103 are coupled to ESS 401 via first and second assist power control modules 1113 and 1115, respectively, thereby providing independent torque control over motors 1101 and 1103. System 1100 includes a torque and traction controller 1117 that performs the same functions, and operates in a similar manner, to previously described torque and traction controller 407. In system 1100, however, torque controller 1117 must control two separate assist motors 1101 and 1103 via dual assist power control modules 1113 and 1115, rather than a single assist motor via a single power control module. Additionally, torque controller 1117 monitors the temperature of both motors 1101 and 1103 via temperature sensors 1119/1121, respectively; monitors the motor speed of both motors 1101 and 1103 via motor speed sensors 1123/1125, respectively; and monitors the temperature of both assist power control modules via temperature sensors 1127/1129, respectively.

In the preferred embodiment of the dual assist drive configuration, assist motors 1101 and 1103 use identical motors. This configuration is preferred since the two assist driven wheels are on the same axis and under most driving conditions, will experience a similar range of wheel slippage. Under these conditions it is desirable for both assist motors to apply a similar amount of torque to their respective wheels. Accordingly, using identical assist motors simplifies system design.

Figure 12:
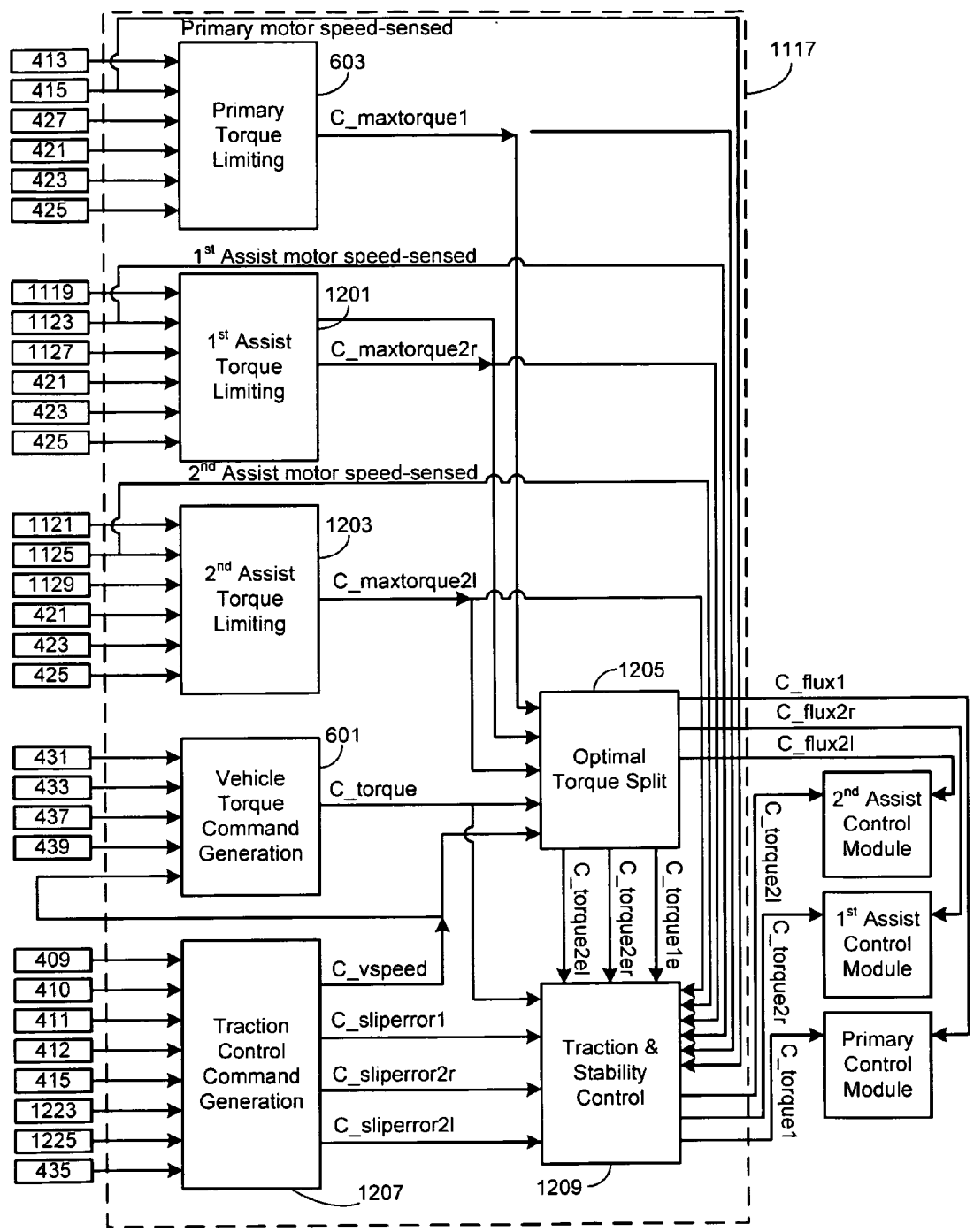
FIG. 12 illustrates the basic elements of the system controller shown in FIG. 11.

Torque and traction control system 1117 operates in a manner quite similar to that described above relative to control system 407, with a few important differences. FIG. 12 is a schematic of controller 1117. Vehicle torque command generation unit 601 functions as previously described, as does primary torque limiting unit 603. In this configuration, however, there are two assist torque limiting units 1201 and 1203, each having as inputs data from their respective temperature and motor speed sensors as well as the temperature data from their respective control modules 1113 and 1115. The output from units 1201 and 1203 are the maximum available torque for the right and left assist motors, i.e., C_maxtorque2$r$ and C_maxtorque2$l$. Although in general these values will be the same, it will be appreciated that under some circumstances the temperature of a particular assist motor and/or a particular assist power control module may be higher than that of the other assist drive, potentially resulting in different maximum available torque values.

Figure 13:
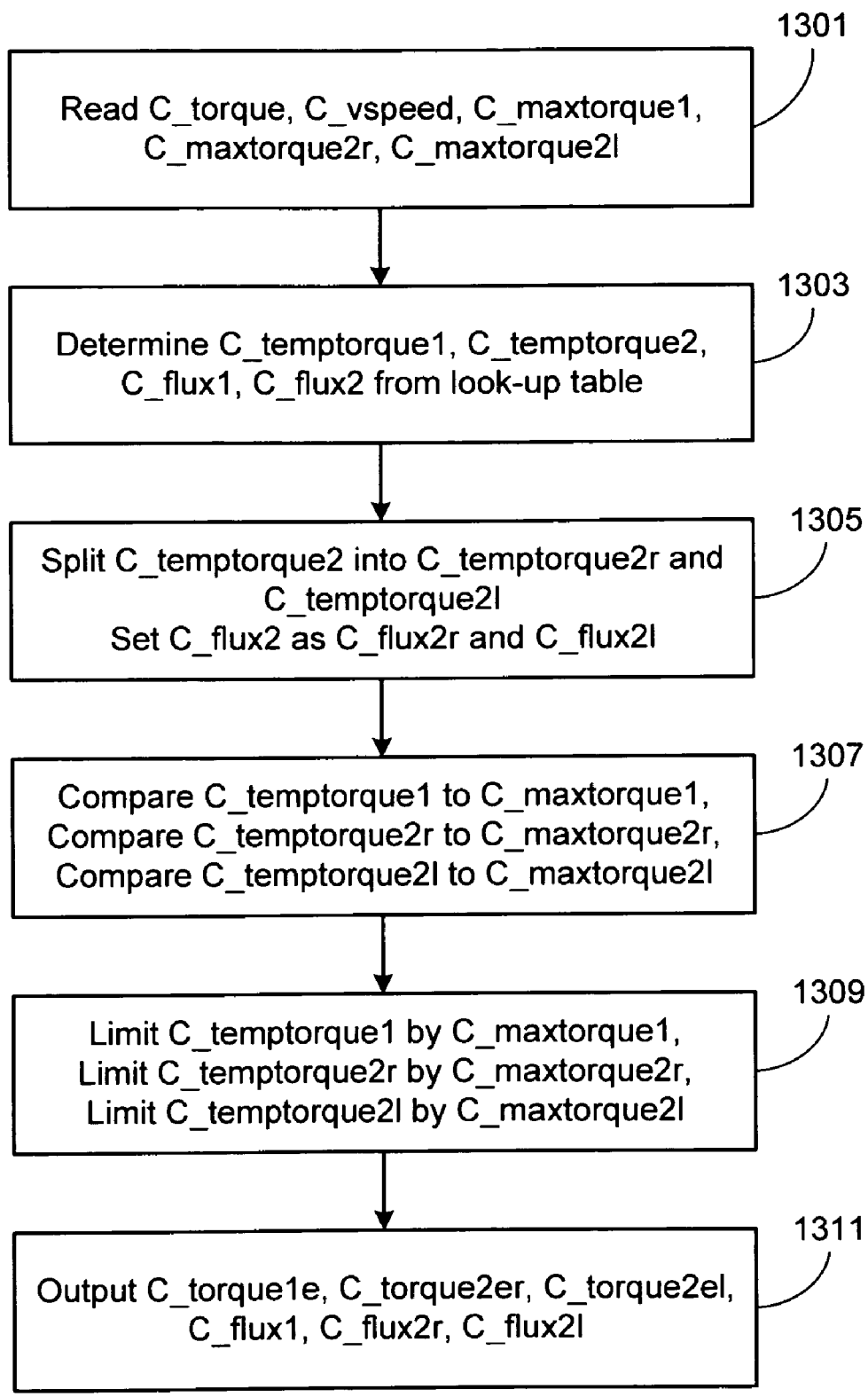
FIG. 13 illustrates the algorithm used to calculate the optimal torque split between the three drive motors, without taking into account wheel slip errors.

Optimal torque split unit 1205 splits the desired combined torque, i.e., C_torque, into three components without taking into account wheel slip. As shown in FIG. 13, the algorithm previously described in relation to FIG. 7 undergoes minor modifications in order to output the three torque components. Initially C_torque, C_vspeed, C_maxtorque1, C_maxtorque2$r$ and C_maxtorque2$l$ are read (step 1301). Next, temporary values for the torque for primary motor 103 (C_temptorque1) and for assist motors 1101 and 1103, combined (C_temptorque2) are determined, as well as values for the motor flux for primary motor 103 (C_flux1) and for assist motors 1101 and 1103, combined (C_flux2). (Step 1303). This step is performed by interpolating data from the look-up table, described previously relative to FIG. 8, that contains optimal torque (i.e., T1 and T2) and optimal flux values (i.e., F1opt and F2opt) based on vehicle speed and total requested torque. Note that the values are only divided into two sets, i.e., one set for the front axle and one set for the rear axle. Next, the set of values for the front axle, assuming the dual assist motors are coupled to the front axle, are divided in half such that half of the torque is applied to each assist motor, and the same flux is applied to each assist motor. (Step 1305). The temporary torque values set in steps 1303 and 1305 are then compared to the maximum available torque values (step 1307) calculated by the primary torque limiting unit and the two assist torque limiting units. If the temporary torque values are less than the maximum available torque values, then the temporary torque values are output as C_torque1$e$ (primary motor), C_torque2$er$ ($1^{st}$ assist motor) and C_torque2$el$ ($2^{nd}$ assist motor); if the temporary torque values are greater than the maximum available torque values, then the maximum available torque values are output as C_torque1$e$, C_torque2$er$ and C_torque2$el$. (Steps 1309 and 1311). The flux values for the primary motor, i.e., C_flux1, and the assist motors, i.e., C_flux2r and C_flux2l, are also output in step 1311.

Traction control command generation unit 1207 operates in a manner similar to that of unit 609, except that it computes and outputs three slip errors, i.e., C_sliperror1, C_sliperror2r and C_sliperror2l. As in the previous embodiment, the unit calculates wheel slip ratios for each wheel. For the axle coupled to a single motor, i.e., primary motor 103, a wheel slip ratio for the axle is calculated, preferably using the higher of the two wheel slip ratios for that particular axle. For the split axle, two wheel slip ratios are used, one per wheel. The three wheel slip ratios are then compared to target wheel slip ratios contained within a lookup table, the lookup table providing target wheel slip ratios as a function of speed and steering angle. For each axle or half-axle, the difference between the computed wheel slip ratio and the target wheel slip ratio yields the computed slip error, referred to herein as "C_sliperror1" for the wheel slip ratio error of the primary-driven axle 101, "C_sliperror2r" for the wheel slip ratio error of the right wheel of first assist-driven axle 1105, and "C_sliperror2l" for the wheel slip ratio error of the left wheel of second assist-driven axle 1107.

Figure 14:
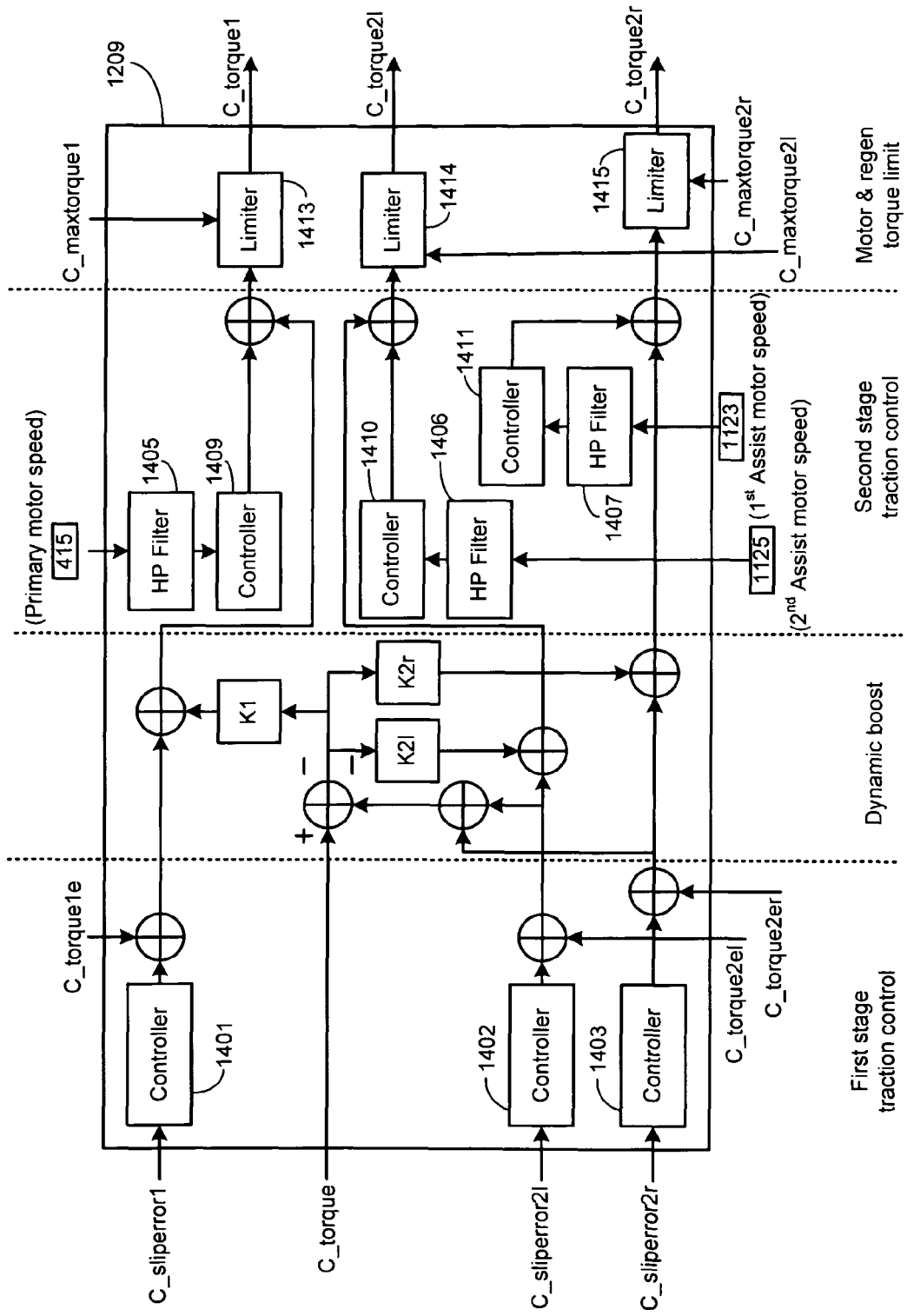
FIG. 14 illustrates a block diagram of the traction and stability control unit shown in FIG. 12.

As illustrated in FIG. 14, the computed slip errors along with the values for the optimized torque split and the total requested torque are input into the first stage of the traction and stability control unit 1209. The first stage independently minimizes the wheel slip ratio errors using a feedback control system, for example using lead-lag compensators or a PID controllers 1401/1402/1403 as shown. In the second stage of unit 1209, motor speed fast disturbances are independently minimized using high pass filters 1405/1406/1407 and compensators (preferably PID controllers) 1409/1410/1411. As in the previous embodiment, between the first and second stages is a transient torque boost feedforward control circuit which adds an amount of torque to each drive motor. After the second stage of traction control, torque limiters 1413/1414/1415 independently limit the torque commands issuing from the second stage based on C_maxtorque1, C_maxtorque2r and C_maxtorque2l. The output of the torque limiters 1413/1414/1415 are torque commands C_torque1, C_torque2l and C_torque2r.

The torque commands from the limiters, i.e., C_torque1, C_torque2r and C_torque2l, and the flux commands from the optimal torque split unit 1205, i.e., C_flux1, C_flux2r and C_flux2l, are input into control modules 403, 1113 and 1115. As previously described, the power control modules can use any of a variety of motor control techniques. Preferably torque and traction controller 1117 uses multiple processing frequencies as previously described relative to controller 407.

Figure 15:
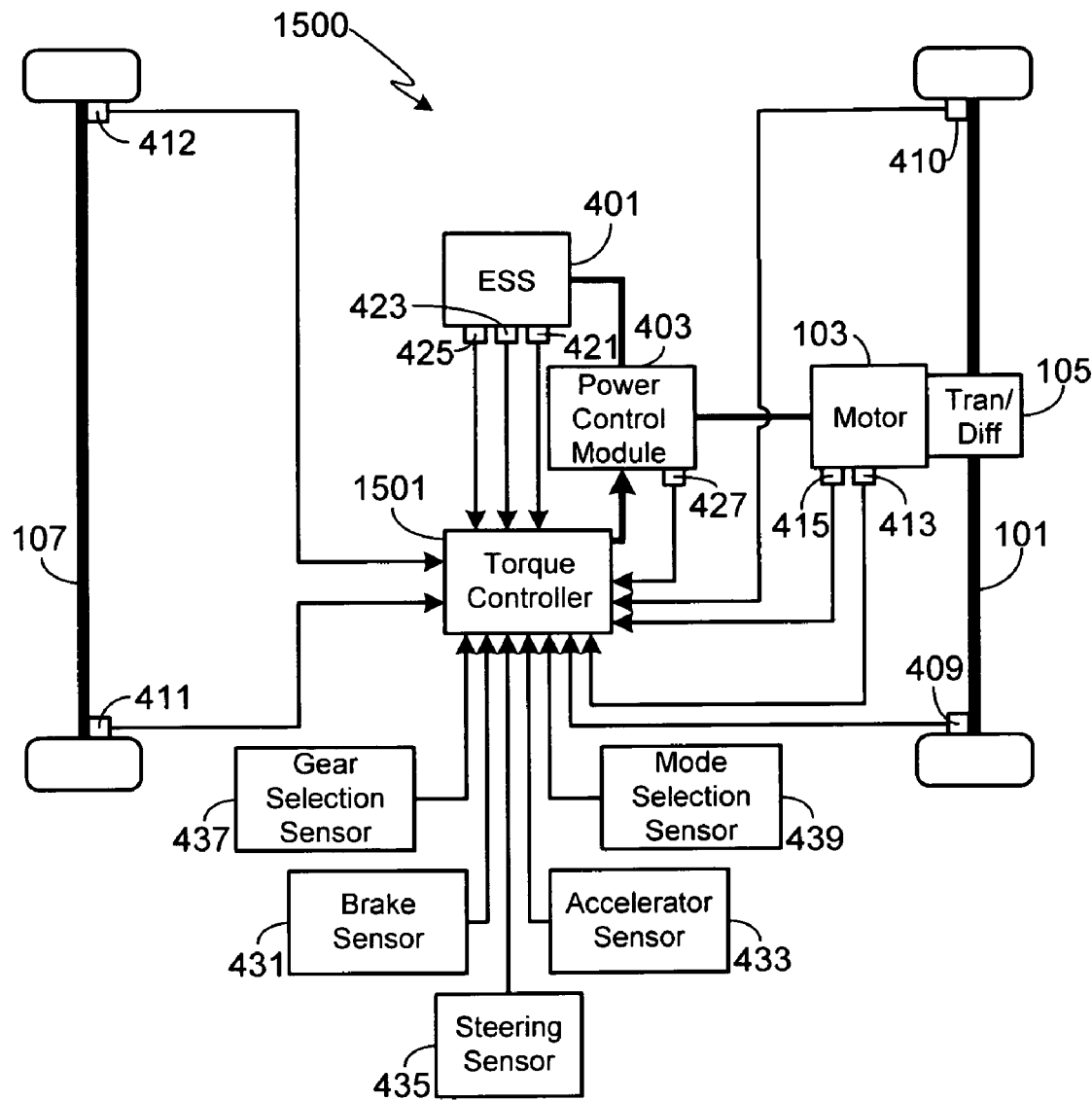
FIG. 15 illustrates the basic elements of a control system for an EV utilizing a single electric motor coupled to one axle.
Figure 16:
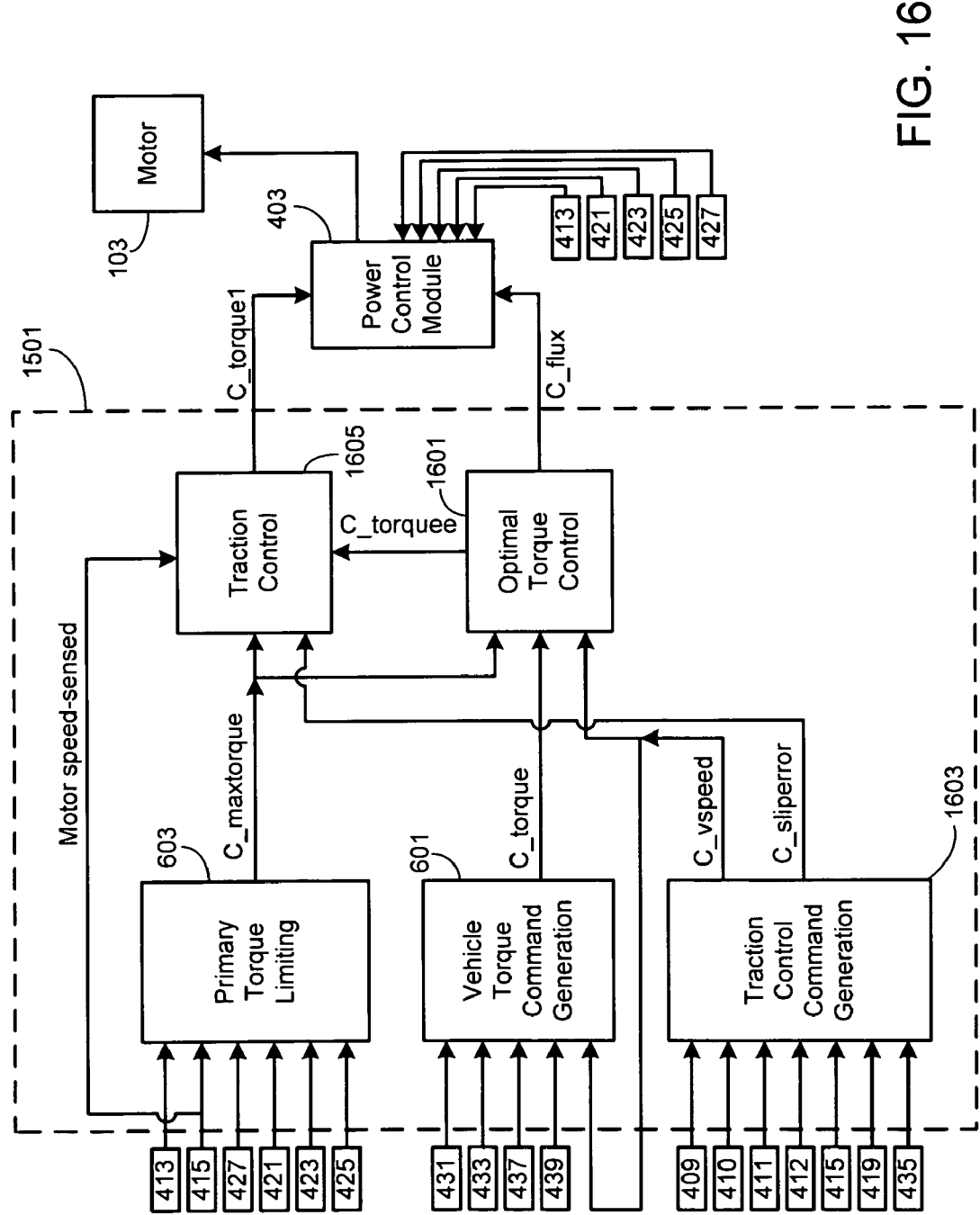
FIG. 16 illustrates the basic elements of the system controller shown in FIG. 15.

Although multiple drive systems are required in order to gain all of the benefits of the present invention, the inventor has found that with certain modifications, even a single drive system as described below can achieve improved performance via improved efficiency and more effective traction control. An exemplary configuration of a single drive EV 1500 is shown in FIG. 15. EV 1500 is basically the same as EV 400 with the removal of the assist drive system and associated components. FIG. 16 illustrates a schematic of controller 1501.

Vehicle torque command generation unit 601 functions as previously described, outputting a torque requirement request, i.e., C_torque, while traction control command generation unit outputs the computed vehicle speed, i.e., C_vspeed. Torque limiting unit 603 calculates the maximum available torque based on monitored data from motor 103, power control module 403 and ESS 401.

Optimal torque control unit 1601 determines an optimal torque, C_torquee, based on the torque request, C_torque, the vehicle speed, C_vspeed, and the maximum available torque, C_maxtorque, without taking into account wheel slip. In order to make this calculation, both the algorithm described relative to FIG. 7 and the look-up table algorithm described relative to FIG. 8 are simplified as shown in corresponding FIGS. 17 and 18.

Figure 17:
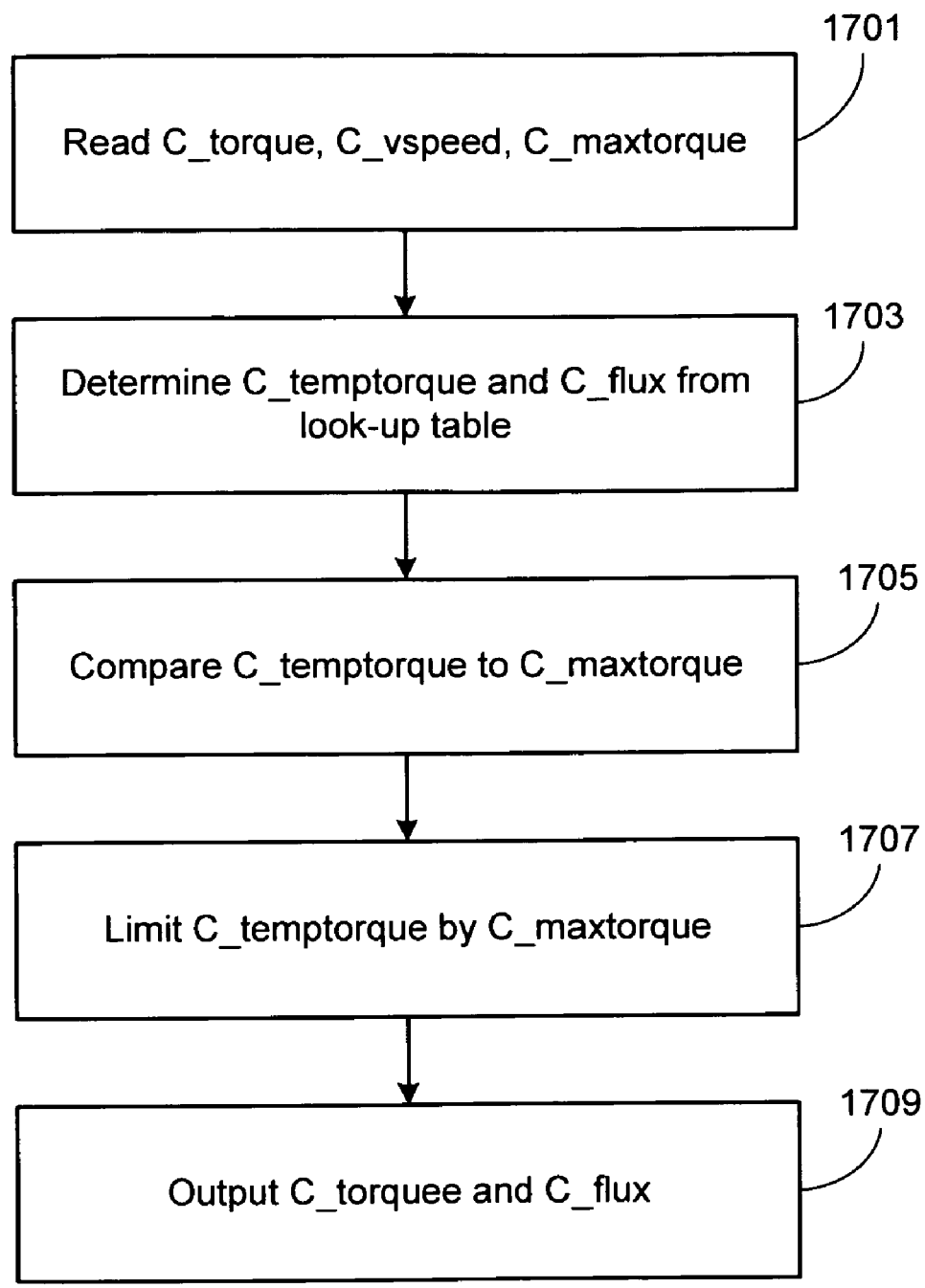
FIG. 17 illustrates the algorithm used to calculate the optimal torque request without taking into account wheel slip errors.

In the first step shown in FIG. 17, C_torque, C_vspeed and C_maxtorque are read. (Step 1701). Next, temporary values for the torque, C_temptorque, and for the flux, C_flux, are determined (step 1703) by interpolating data from a look-up table. The temporary torque value set in step 1703 is then compared to (step 1705), and limited by (step 1707), the maximum available torque value calculated by torque limiting unit 603, before being output as C_torquee (step 1709). The flux value for the motor, i.e., C_flux, is also output in step 1709.

Figure 18:
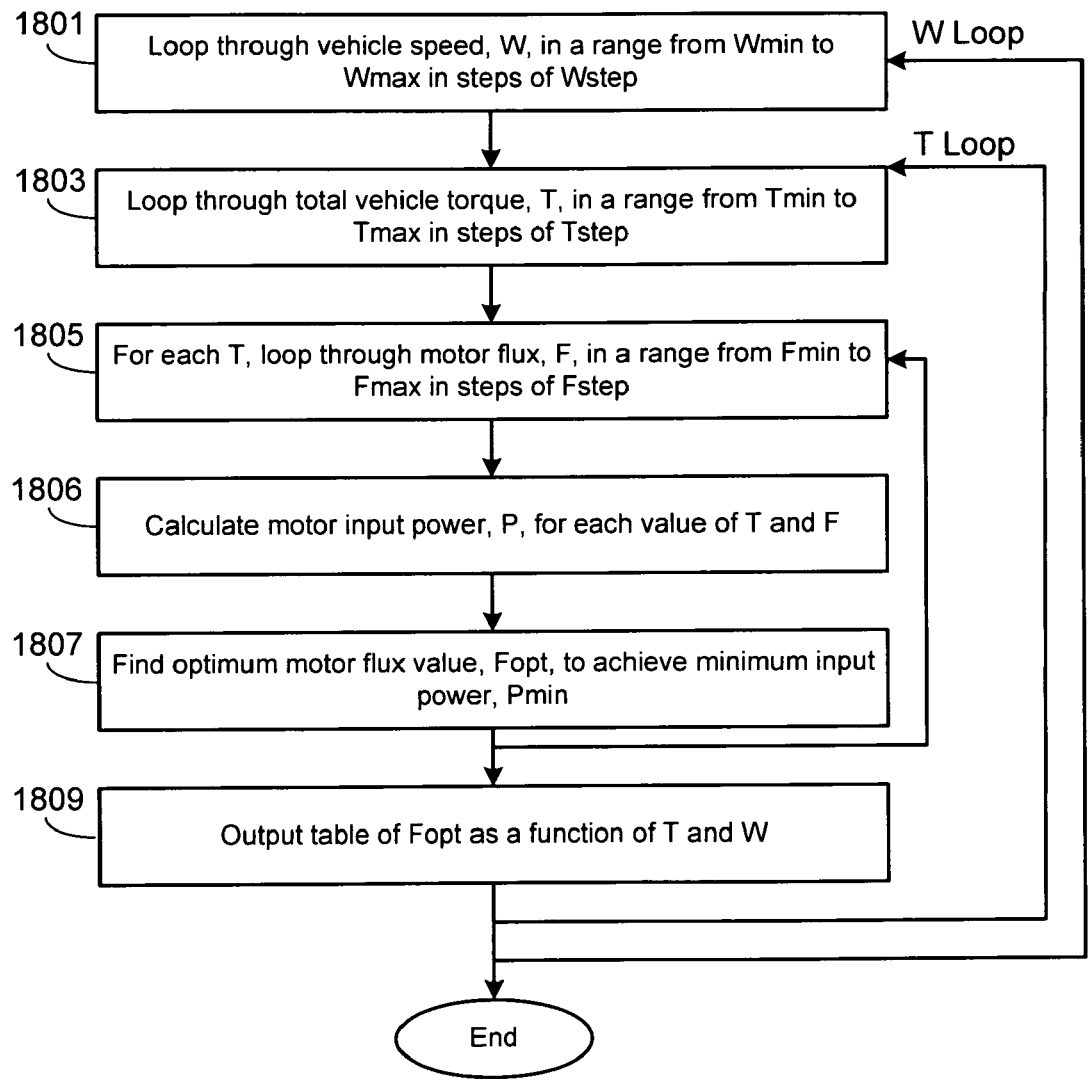
FIG. 18 illustrates the algorithm used to generate the look-up table utilized by the torque control unit.

The algorithm used to generate the look-up table used in step 1703 is illustrated in FIG. 18. As shown, the approach is similar to that illustrated in FIG. 8, except that is has been simplified due to the elimination of the assist drive system. In step 1801, a first loop is initiated in which vehicle speed, W, is stepped through from a minimum value, Wmin, to a maximum value, Wmax, in steps of Wstep. In step 1803, a second loop is initiated in which total vehicle torque, T, is stepped through from a minimum value, Tmin, to a maximum value, Tmax, in steps of Tstep. In the next series of steps, steps 1805-1807, the optimum flux value, Fopt, is determined. Initially, for a given value of T the motor flux F is stepped through from a minimum value, Fmin, to a maximum value, Fmax, in steps of Fstep (step 1805). Then for each value of T and F, a value for motor input power, P, is calculated (step 1806). Next, Fopt is determined, based on achieving the minimum input power, Pmin (step 1807). In the last step, values for Fopt are output as a function of T and W (step 1809).

Traction control command generation unit 1603 operates in a manner similar to that of unit 609, except that it computes a single slip error, C_sliperror. In this embodiment, unit 1603 calculates wheel slip ratios for each wheel of driven axle 101. The wheel slip ratio for this axle is then calculated, preferably using the higher of the two wheel slip ratios. The wheel slip ratio is then compared to a target wheel slip ratio contained within a lookup table, the lookup table providing target wheel slip ratios as a function of speed and steering angle. The difference between the computed wheel slip ratio and the target wheel slip ratio yields the computed slip error, referred to herein as "C_sliperror".

Figure 19:
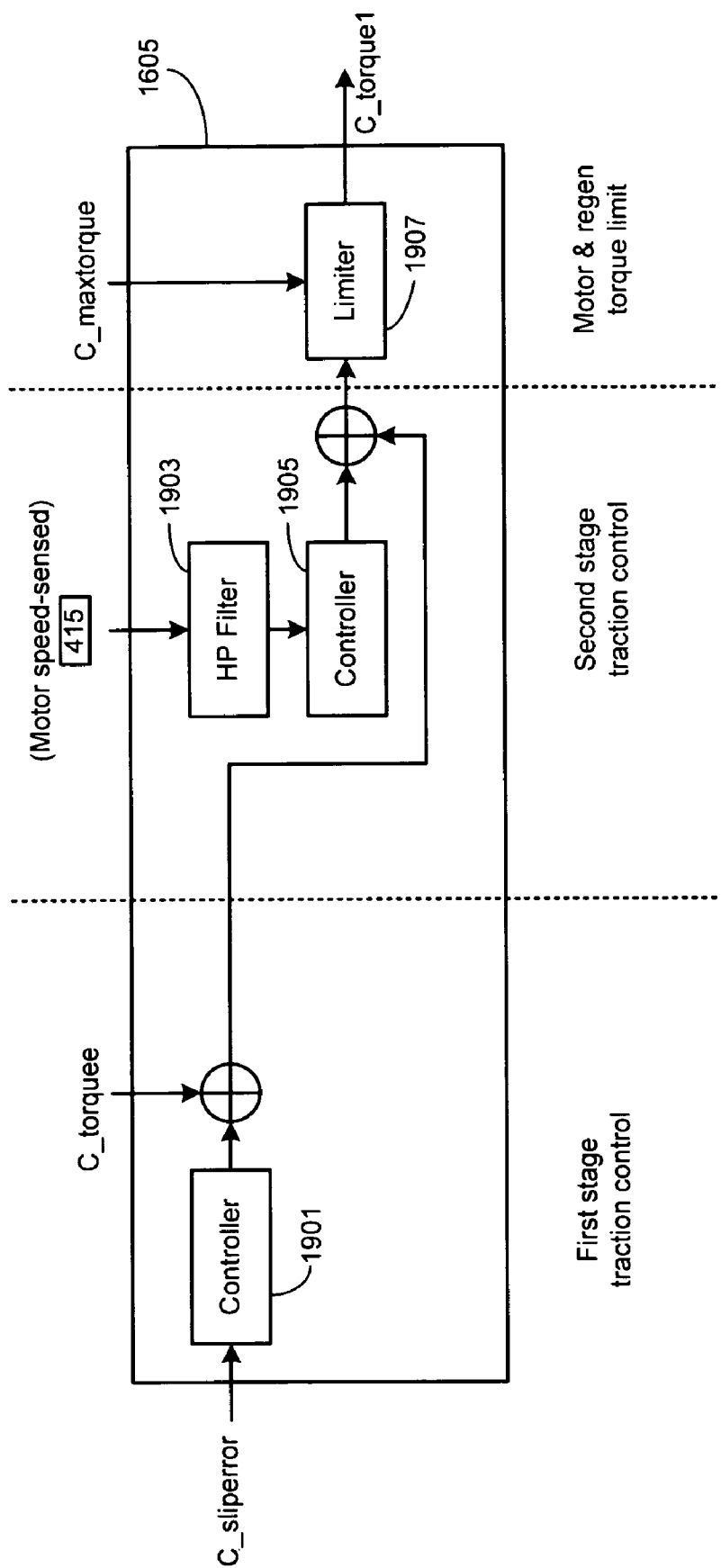
FIG. 19 illustrates a block diagram of the traction control unit shown in FIG. 16.

As illustrated in FIG. 19, the computed slip error and the optimized torque are input into the first stage of the traction control unit 1605. The first stage independently minimizes the wheel slip ratio error using a feedback control system, for example using a lead-lag compensator, a PID controller 1901, or other controller type. In the second stage of unit 1605, motor speed fast disturbances are independently minimized using a high pass filter 1903 and a compensator (preferably a PID controller) 1905. Preferably, controllers 1901 and 1905 have different bandwidths and dynamic responses. For example, the bandwidth of the first stage loop is preferably lower than that of the second stage. In at least one embodiment, the sampling frequency of both loops is the same. High pass filter 1903 is designed to remove dc and certain low frequency components of the input motor speed. After the second stage of traction control, a torque limiter 1907 limits the torque command issuing from the second stage based on C_maxtorque. The output of torque limiter 1907 is torque command C_torque1.

The torque command from the limiter, i.e., C_torque1, and the flux command from the optimal torque unit 1601, i.e., C_flux, are input into control module 403. As previously described, the power control module can use any of a variety of motor control techniques. Preferably torque and traction controller 1501 uses multiple processing frequencies as previously described relative to controller 407.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. An electric vehicle drive system, comprising:
   a primary drive system, comprising:
      a primary electric motor, said primary electric motor mechanically coupled to at least one wheel of a first vehicle axle, wherein said primary electric motor provides propulsion power to said at least one wheel of said first vehicle axle; and
      a primary power control module electrically connected to said primary electric motor, said primary power control module configured to receive primary motor torque commands, and said primary power control module configured to control said primary electric motor based on said primary motor torque commands;
   an assist drive system, comprising:
      a first assist electric motor, said first assist electric motor mechanically coupled to a first wheel of a second vehicle axle, wherein said first assist electric motor provides propulsion power to said first wheel of said second vehicle axle; and
      a first assist power control module electrically connected to said first assist electric motor, said first assist power control module configured to receive first assist motor torque commands, and said first assist power control module configured to control said first assist electric motor based on said first assist motor torque commands;
      a second assist electric motor, said second assist electric motor mechanically coupled to a second wheel of said second vehicle axle, wherein said second assist electric motor provides propulsion power to said second wheel of said second vehicle axle; and
      a second assist power control module electrically connected to said second assist electric motor, said second assist power control module configured to receive second assist motor torque commands, and said second assist power control module configured to control said second assist electric motor based on said second assist motor torque commands;
   a plurality of wheel speed sensors; and
   a torque control system electrically connected to said primary, first assist and second assist power control modules and to said plurality of wheel speed sensors, wherein said torque control system outputs said primary motor torque commands to said primary power control module and outputs said first assist motor torque commands to said first assist power control module and outputs said second assist motor torque commands to said second assist power control module, wherein said torque control system further comprises:
      a traction control command generation unit for computing vehicle speed, wheel slip ratios corresponding to said plurality of wheel speed sensors, a first slip error corresponding to said first vehicle axle, a second slip error corresponding to said first wheel of said second vehicle axle, and a third slip error corresponding to said second wheel of said second vehicle axle;
      a torque split unit for computing an optimal torque split between said primary drive system and said assist drive system based on said vehicle speed and a total required drive torque request, wherein said optimal torque split comprises an optimal primary motor torque request and an optimal assist drive system torque request, wherein said torque split unit further splits said optimal assist drive system torque request into an optimal first assist motor torque request and an optimal second assist motor torque request;
      a traction and stability control unit comprising:
         a first stage feedback control system for minimizing said first slip error, said second slip error, and said third slip error;
         means for transforming said optimal primary motor torque request into said primary motor torque command in response to an output from said first stage feedback control system;
         means for transforming said optimal first assist motor torque request into said first assist motor torque command in response to said output from said first stage feedback control system; and
         means for transforming said optimal second assist motor torque request into said second assist motor torque command in response to said output from said first stage feedback control system.

2. The electric vehicle drive system of claim 1, wherein said torque split unit cycles at a first frequency, wherein said traction and stability control unit cycles at a second frequency, and wherein said second frequency is between 10 and 30 times said first frequency.

3. The electric vehicle drive system of claim 2, wherein said first frequency is in the range of 100 Hz to 2 kHz.

4. The electric vehicle drive system of claim 1, further comprising at least one primary motor speed sensor and at least one first assist motor speed sensor and at least one second assist motor speed sensor, said traction and stability control unit further comprising a second stage feedback control system for minimizing primary motor speed fast disturbances and first assist motor speed fast disturbances and second assist motor speed fast disturbances, wherein said means for transforming said optimal primary motor torque request into said primary motor torque command is in response to said output from said first stage feedback control system and an output from said second stage feedback control system, and wherein said means for transforming said optimal first assist motor torque request into said first assist motor torque command is in response to said output from said first stage feedback control system and said output from said second stage feedback control system, and wherein said means for transforming said optimal second assist motor torque request into said second assist motor torque command is in response to said output from said first stage feedback control system and said output from said second stage feedback control system.

5. The electric vehicle drive system of claim 1, said traction and stability control unit further comprising a transient torque boost feedforward control circuit, wherein said transient torque boost feedforward control circuit acts on said output from said first stage feedback control system.

6. The electric vehicle drive system of claim 1, said torque control system further comprising a vehicle torque command generation unit for computing said total required drive torque request from said vehicle speed and from a plurality of user input sensors, said user input sensors comprised of a brake sensor and an accelerator sensor.

7. The electric vehicle drive system of claim 1, further comprising:
   a primary motor speed sensor;
   a primary motor temperature sensor;
   a first assist motor speed sensor;
   a first assist motor temperature sensor;
   a second assist motor speed sensor;
   a second assist motor temperature sensor; and
   wherein said torque control system further comprises:
   a primary torque limiting unit for computing a primary motor maximum available torque, wherein said primary torque limiting unit is coupled to said primary motor speed and temperature sensors;
   a first assist torque limiting unit for computing a first assist motor maximum available torque, wherein said first assist torque limiting unit is coupled to said first assist motor speed and temperature sensors;
   a second assist torque limiting unit for computing a second assist motor maximum available torque, wherein said second assist torque limiting unit is coupled to said second assist motor speed and temperature sensors; and
   wherein said traction and stability control unit further comprises:
   a first limiter for limiting said primary motor torque command by said primary motor maximum available torque;
   a second limiter for limiting said first assist motor torque command by said first assist motor maximum available torque; and
   a third limiter for limiting said second assist motor torque command by said second assist motor maximum available torque.

8. The electric vehicle drive system of claim 7, further comprising:
   a primary power control module temperature sensor, wherein said primary torque limiting unit is coupled to said primary power control module temperature sensor;
   a first assist power control module temperature sensor, wherein said first assist torque limiting unit is coupled to said first assist power control module temperature sensor; and
   a second assist power control module temperature sensor, wherein said second assist torque limiting unit is coupled to said second assist power control module temperature sensor.

9. The electric vehicle drive system of claim 7, further comprising:
   a primary energy storage system (ESS) coupled to said primary power control module;
   a primary ESS temperature sensor;
   a primary ESS voltage sensor;
   a primary ESS current sensor;
   a secondary ESS coupled to said first assist power control module and to said second assist power control module;
   a secondary ESS temperature sensor;
   a secondary ESS voltage sensor;
   a secondary ESS current sensor; and
   wherein said primary torque limiting unit is coupled to said primary ESS temperature, voltage and current sensors, and wherein said first assist torque limiting unit and said second assist torque limiting unit are coupled to said secondary ESS temperature, voltage and current sensors.

10. The electric vehicle drive system of claim 7, further comprising:
    an energy storage system (ESS) coupled to said primary, first assist and second assist power control modules;
    an ESS temperature sensor;
    an ESS voltage sensor;
    an ESS current sensor; and
    wherein said primary torque limiting unit is coupled to said ESS temperature, voltage and current sensors, wherein said first assist torque limiting unit is coupled to said ESS temperature, voltage and current sensors, and wherein said second assist torque limiting unit is coupled to said ESS temperature, voltage and current sensors.

11. The electric vehicle drive system of claim 1, said torque control system further comprising:
    a primary torque limiting unit for computing a primary motor maximum available torque, wherein said optimal primary motor torque request is limited by said primary motor maximum available torque; and
    a first assist torque limiting unit for computing a first assist motor maximum available torque, wherein said optimal first assist motor torque request is limited by said first assist motor maximum available torque; and
    a second assist torque limiting unit for computing a second assist motor maximum available torque, wherein said optimal second assist motor torque request is limited by said second assist motor maximum available torque.

12. The electric vehicle drive system of claim 1, wherein said optimal primary motor torque request and said optimal assist drive system torque request are interpolated from a look-up table.

13. The electric vehicle drive system of claim 1, wherein said torque split unit computes an optimal primary motor flux command and an optimal first assist motor flux command and an optimal second assist motor flux command, wherein said primary power control module is configured to receive said optimal primary motor flux commands and control said primary motor based on said primary motor torque commands and on said optimal primary motor flux commands, wherein said first assist power control module is configured to receive said optimal first assist motor flux commands and control said first assist motor based on said first assist motor torque commands and on said optimal first assist motor flux commands, and wherein said second assist power control module is configured to receive said optimal second assist motor flux commands and control said second assist motor based on said second assist motor torque commands and on said optimal second assist motor flux commands.

14. The electric vehicle drive system of claim 1, further comprising:
    a first motor speed sensor coupled to said primary electric motor and electrically connected to said torque control system;
    a second motor speed sensor coupled to said first assist electric motor and electrically connected to said torque control system;
    a third motor speed sensor coupled to said second assist electric motor and electrically connected to said torque control system; and
    a steering sensor electrically connected to said torque control system; and
    wherein said traction control command generation unit computes said vehicle speed based on output from said first motor speed sensor, said second motor speed sensor, said third motor speed sensor and said steering sensor.

15. A method of enhancing traction of an electric vehicle, the electric vehicle having a primary electric motor coupled to a first axle, a first assist electric motor coupled to a first wheel of a second axle, and a second assist electric motor coupled to a second wheel of said second axle, the method comprising the steps of:
  a) computing a vehicle speed corresponding to said electric vehicle, wherein said vehicle speed computing step is performed by a traction control command generation unit;
  b) computing a total torque requirement request, wherein said total torque requirement request computing step is performed by a vehicle torque command generation unit;
  c) splitting said total torque requirement request into an optimal primary motor torque request and an optimal assist drive system torque request, wherein said total torque requirement request splitting step is performed by an optimal torque splitting unit;
  d) splitting said optimal assist drive system torque request into an optimal first assist motor torque request and an optimal second assist motor torque request, wherein said optimal assist drive system torque request splitting step is performed by said optimal torque splitting unit;
  e) monitoring at least one first axle wheel speed sensor corresponding to said first axle, and a second wheel speed sensor corresponding to said first wheel of said second axle, and a third wheel speed sensor corresponding to said second wheel of said second axle;
  f) computing a first slip error corresponding to said first axle, wherein said first slip error computing step is performed by said traction control command generation unit;
  g) computing a second slip error corresponding to said first wheel of said second axle, wherein said second slip error computing step is performed by said traction control command generation unit;
  h) computing a third slip error corresponding to said second wheel of said second axle, wherein said third slip error computing step is performed by said traction control command generation unit;
  i) minimizing said first slip error and said second slip error and said third slip error using a feedback control system implemented by a traction and stability control unit, said traction and stability control unit further performing the steps of transforming said optimal primary motor torque request into a primary motor torque command and transforming said optimal first assist motor torque request into a first assist motor torque command and transforming said optimal second assist motor torque request into a second assist motor torque command based on said step of minimizing said first slip error, said second slip error and said third slip error;
  j) controlling said primary electric motor based on said primary motor torque command;
  k) controlling said first assist electric motor based on said first assist motor torque command;
  l) controlling said second assist electric motor based on said second assist motor torque command; and
  m) repeating steps a)-l) throughout operation of said electric vehicle.

16. The method of claim 15, wherein said vehicle speed computing step further comprises the steps of:
  monitoring a primary motor speed sensor;
  monitoring a first assist motor speed sensor;
  monitoring a second assist motor speed sensor; and
  monitoring a steering sensor.

17. The method of claim 15, wherein said total torque requirement request computing step further comprises the steps of:
  inputting said vehicle speed into said vehicle torque command generation unit;
  monitoring a brake sensor; and
  monitoring an accelerator sensor.

18. The method of claim 15, wherein said total torque requirement request splitting step further comprises the step of interpolating data from a look-up table, said look-up table containing said optimal primary motor torque request and said optimal assist drive system torque request as a function of said vehicle speed and said total torque requirement request.

19. The method of claim 15, wherein step c) further comprises the steps of:
  monitoring a primary motor speed sensor;
  monitoring a primary motor temperature sensor;
  computing a primary motor maximum available torque; and
  limiting said optimal primary motor torque request by said primary motor maximum available torque; and
  wherein step d) further comprises the steps of:
  monitoring a first assist motor speed sensor;
  monitoring a first assist motor temperature sensor;
  computing a first assist motor maximum available torque;
  limiting said optimal first assist motor torque request by said first assist motor maximum available torque;
  monitoring a second assist motor speed sensor;
  monitoring a second assist motor temperature sensor;
  computing a second assist motor maximum available torque; and
  limiting said optimal second assist motor torque request by said second assist motor maximum available torque.

20. The method of claim 19, further comprising the steps of:
  monitoring a primary power control module temperature sensor, said primary power control module temperature sensor in thermal communication with a primary power control module, said primary power control module electrically connected to said primary motor; and
  monitoring a first assist power control module temperature sensor, said first assist power control module temperature sensor in thermal communication with a first assist power control module, said first assist power control module electrically connected to said first assist motor; and
  monitoring a second assist power control module temperature sensor, said second assist power control module temperature sensor in thermal communication with a second assist power control module, said second assist power control module electrically connected to said second assist motor.

21. The method of claim 19, further comprising the steps of:
  monitoring a primary energy storage system (ESS) temperature sensor, said primary ESS temperature sensor in thermal communication with a primary ESS, said primary ESS electrically connected to a primary power control module, said primary power control module electrically connected to said primary motor;
  monitoring a primary ESS voltage sensor;
  monitoring a primary ESS current sensor;
  monitoring a secondary ESS temperature sensor, said secondary ESS temperature sensor in thermal communication with a secondary ESS, said secondary ESS electrically connected to a first assist power control module and a second assist power control module, said first assist power control module electrically connected to said first assist motor, said second assist power control module electrically connected to said second assist motor;
  monitoring a secondary ESS voltage sensor; and
  monitoring a secondary ESS current sensor.

22. The method of claim 19, further comprising the steps of:
- monitoring an energy storage system (ESS) temperature sensor, said ESS temperature sensor in thermal communication with an ESS, said ESS electrically connected to a primary power control module and to a first assist power control module and to a second assist power control module, said primary power control module electrically connected to said primary motor, said first assist power control module electrically connected to said first assist motor, said second assist power control module electrically connected to said second assist motor;
- monitoring an ESS voltage sensor; and
- monitoring an ESS current sensor.

23. The method of claim 15, further comprising the steps of minimizing primary motor speed fast disturbances and first assist motor speed fast disturbances and second assist motor speed fast disturbances using a second feedback control system implemented by said traction and stability control unit, wherein said steps of transforming said optimal primary motor torque request into said primary motor torque command and transforming said optimal first assist motor torque request into said first assist motor torque command and transforming said optimal second assist motor torque request into said second assist motor torque command are based on said step of minimizing said first slip error, said second slip error and said third slip error and on said step of minimizing said primary motor speed fast disturbances, said first assist motor speed fast disturbances and said second assist motor speed fast disturbances.

24. The method of claim 15, step i) further comprising the steps of:
- monitoring a primary motor speed sensor;
- monitoring a primary motor temperature sensor;
- computing a primary motor maximum available torque;
- limiting said primary motor torque command by said primary motor maximum available torque;
- monitoring a first assist motor speed sensor;
- monitoring a first assist motor temperature sensor;
- computing a first assist motor maximum available torque;
- limiting said first assist motor torque command by said first assist motor maximum available torque;
- monitoring a second assist motor speed sensor;
- monitoring a second assist motor temperature sensor;
- computing a second assist motor maximum available torque; and
- limiting said second assist motor torque command by said second assist motor maximum available torque.

25. The method of claim 24, further comprising the steps of:
- monitoring a primary power control module temperature sensor, said primary power control module temperature sensor in thermal communication with a primary power control module, said primary power control module electrically connected to said primary motor;
- monitoring a first assist power control module temperature sensor, said first assist power control module temperature sensor in thermal communication with a first assist power control module, said first assist power control module electrically connected to said first assist motor; and
- monitoring a second assist power control module temperature sensor, said second assist power control module temperature sensor in thermal communication with a second assist power control module, said second assist power control module electrically connected to said first assist motor.

26. The method of claim 24, further comprising the steps of:
- monitoring a primary energy storage system (ESS) temperature sensor, said primary ESS temperature sensor in thermal communication with a primary ESS, said primary ESS electrically connected to a primary power control module, said primary power control module electrically connected to said primary motor;
- monitoring a primary ESS voltage sensor;
- monitoring a primary ESS current sensor;
- monitoring a secondary ESS temperature sensor, said secondary ESS temperature sensor in thermal communication with a secondary ESS, said secondary ESS electrically connected to a first assist power control module and to a second assist power control module, said first assist power control module electrically connected to said first assist motor, said second assist power control module electrically connected to said second assist motor;
- monitoring a secondary ESS voltage sensor; and
- monitoring a secondary ESS current sensor.

27. The method of claim 24, further comprising the steps of:
- monitoring an energy storage system (ESS) temperature sensor, said ESS temperature sensor in thermal communication with an ESS, said ESS electrically connected to a primary power control module and to a first assist power control module and to a second assist power control module, said primary power control module electrically connected to said primary motor, said first assist power control module electrically connected to said first assist motor, said second assist power control module electrically connected to said second assist motor;
- monitoring an ESS voltage sensor; and
- monitoring an ESS current sensor.

28. The method of claim 15, wherein steps a) through d) and f) through h) are repeated at a first frequency and steps i) through l) are repeated at a second frequency, wherein said second frequency is between 10 and 30 times said first frequency.

29. The method of claim 15, wherein steps b) through d) are repeated at a first frequency, steps i) through l) are repeated at a second frequency between 10 and 30 times said first frequency, and wherein steps a) and f) through h) are repeated at a third frequency, said third frequency between said first and second frequencies.

30. The method of claim 15, further comprising the step of computing an optimal primary motor flux command and an optimal first assist motor flux command and an optimal second assist motor flux command, wherein said step of computing said optimal primary motor flux command and said optimal first assist motor flux command and said optimal second assist motor flux command further comprises the step of interpolating data from a look-up table, said look-up table containing said optimal primary motor flux command and said optimal first assist motor flux command and said optimal second assist motor flux command as a function of said vehicle speed and said total torque requirement request.

* * * * *